US012294826B2

(12) United States Patent
Wang et al.

(10) Patent No.: US 12,294,826 B2
(45) Date of Patent: May 6, 2025

(54) EARPHONES

(71) Applicant: SHENZHEN SHOKZ CO., LTD., Guangdong (CN)

(72) Inventors: Yonggen Wang, Shenzhen (CN); Zhiqing Liu, Shenzhen (CN); Zhen Wang, Shenzhen (CN); Xinnan Mao, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 358 days.

(21) Appl. No.: 17/809,893

(22) Filed: Jun. 29, 2022

(65) Prior Publication Data

US 2022/0337935 A1 Oct. 20, 2022

Related U.S. Application Data

(63) Continuation of application No. PCT/CN2021/089093, filed on Apr. 22, 2021.

(30) Foreign Application Priority Data

Apr. 30, 2020 (CN) ......................... 202020719524.7
Apr. 30, 2020 (CN) ......................... 202020719543.X
Apr. 30, 2020 (CN) ......................... 202020720108.9

(51) Int. Cl.
*H04R 1/10* (2006.01)
*H04R 1/40* (2006.01)
*H04R 3/00* (2006.01)

(52) U.S. Cl.
CPC ......... *H04R 1/1066* (2013.01); *H04R 1/1008* (2013.01); *H04R 1/105* (2013.01);
(Continued)

(58) Field of Classification Search
CPC .... H04R 1/1066; H04R 1/1008; H04R 1/105; H04R 1/1075; H04R 1/406; H04R 3/005;
(Continued)

(56) References Cited

U.S. PATENT DOCUMENTS 7,978,870 B2 * 7/2011 Cozens ................ H04R 1/1066 381/370
8,724,825 B2 * 5/2014 Birch ..................... H04R 1/083 381/384

(Continued)

FOREIGN PATENT DOCUMENTS

CN 2822077 Y 9/2006
CN 109495809 A 3/2019

(Continued)

OTHER PUBLICATIONS

International Search Report in PCT/CN2021/089093 mailed on Jul. 22, 2021, 6 pages.

*Primary Examiner* — Suhan Ni
(74) *Attorney, Agent, or Firm* — METIS IP LLC

(57) ABSTRACT

The present disclosure discloses an earphone. The earphone may include a wearing assembly and a core module. The core module may be disposed on one end of the wearing assembly. The wearing assembly may be configured to fix the core module on a head of a user. The core module may include a core housing, a core, and a cover plate. An opening may be disposed on one end of the core housing, and the cover plate may be covered on the opening of the core housing, so as to form a chamber structure inside the core housing for accommodating the core.

8 Claims, 28 Drawing Sheets

(52) U.S. Cl.
CPC ........... *H04R 1/1075* (2013.01); *H04R 1/406* (2013.01); *H04R 3/005* (2013.01); *H04R 1/1041* (2013.01); *H04R 2460/13* (2013.01)

(58) Field of Classification Search
CPC .............. H04R 1/1041; H04R 2460/13; H04R 2201/107; H04R 1/2888
USPC ........................................................... 381/92
See application file for complete search history.

(56) References Cited

U.S. PATENT DOCUMENTS

| | | | | |
|---|---|---|---|---|
| 2003/0169898 | A1* | 9/2003 | Arasawa .............. | H04R 1/1066 381/370 |
| 2006/0256992 | A1* | 11/2006 | Liao ..................... | H04R 1/1058 381/371 |
| 2015/0172802 | A1* | 6/2015 | Takeno ................ | H04R 5/0335 381/378 |
| 2019/0215592 | A1 | 7/2019 | Lu et al. | |

FOREIGN PATENT DOCUMENTS

| | | | |
|---|---|---|---|
| CN | 110290442 | A | 9/2019 |
| CN | 211702346 | U | 10/2020 |
| CN | 211702347 | U | 10/2020 |
| CN | 212086434 | U | 12/2020 |

* cited by examiner

I-I

II-II

III-III

EARPHONES

CROSS REFERENCE TO RELATED APPLICATIONS

This application is a Continuation of International Application No. PCT/CN2021/089093 filed on Apr. 22, 2021, which claims priority of Chinese Patent Application No. 202020720108.9, filed on Apr. 30, 2020, Chinese Patent Application No. 202020719524.7, filed on Apr. 30, 2020, and Chinese Patent Application No. 202020719543.X, filed on Apr. 30, 2020, the entire contents of each of which are incorporated herein by reference.

TECHNICAL FIELD

The present disclosure relates to technical fields of acoustic technology, and in particular, to earphone structures.

BACKGROUND

Earphones (e.g., open earphones, in-ear earphones, etc.) are portable acoustic output devices that can realize sound transmission within a specific range. In practical applications, assemblies in the earphones need a good structural stability (e.g., a structural stability between assemblies, such as a core, a battery, a main control circuit board, etc., of an earphone and a housing of the earphone) to ensure that the earphones have good quality.

Therefore, it is desirable to provide earphone structures with the good stability.

SUMMARY

Some embodiments of the present disclosure provide an earphone. The earphone may include a wearing assembly and a core module. The core module may be disposed on one end of the wearing assembly. The wearing assembly may be configured to fix the core module on a head of a user. The core module may include a core housing, a core, and a cover plate. An opening may be disposed on one end of the core housing, and the cover plate may be covered on the opening of the core housing, so as to form a chamber structure inside the core housing for accommodating the core.

In some embodiments, the earphone may include a first microphone and a second microphone. The first microphone may be accommodated in the core housing, and the second microphone may be disposed outside the core housing.

In some embodiments, the core module may further include a core bracket. The core may be disposed on the core bracket, and the core bracket and the core may be accommodated in the chamber structure inside in the core housing. A press structure may be disposed on one side of the cover plate toward the core housing. The press structure may be configured to press and fix the core bracket in the core housing.

In some embodiments, the core module may further include a core bracket. The core bracket may include an annular bracket body and a limiting structure disposed on the bracket body. The core may be hung on the bracket body. The limiting structure and the core housing may be in an interference fit, so that the core bracket is relatively fixed with the core housing along a circumferential direction of the bracket body.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
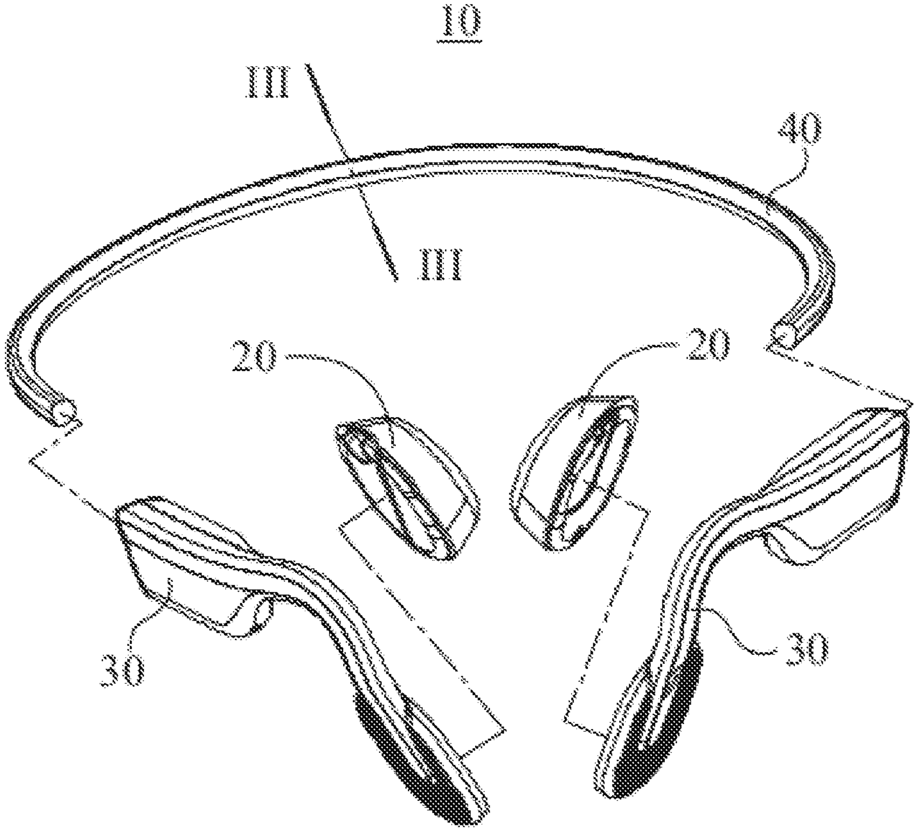
FIG. 1 is a schematic diagram illustrating an exemplary structure of an earphone according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obviously obtained from the context or the context illustrates otherwise, the same numeral in the drawings refers to the same structure or operation.

It should be understood that the "system," "device," "unit," and/or "module" used herein is configured to distinguish different components, elements, portions, parts, or assemblies at different levels. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise" and "include" only indicate that the steps and units that have been clearly identified are included, the steps and units do not constitute an exclusive list, and the method or device may also include other steps or units.

An earphone described in some embodiments of the present disclosure refers to a portable acoustic output device that may realize sound transmission within a certain range. In some embodiments, the earphone may include a bone conduction earphone and/or an air conduction earphone. In some embodiments, the earphone may include an in-ear earphone, a headphone, an open earphone, or the like. In some embodiments, the earphone may be worn on a head or other portions (e.g., a neck, a shoulder, etc.) of a user through a structure, such as a fixed structure (e.g., an ear hook). In some embodiments, the earphone may also be combined with other wearable devices (e.g., smart helmets, glasses, etc.) to be worn on the head or the other parts of the user.

In some embodiments, when the earphone is a bone conduction earphone, the earphone may be close to but not blocking ears of the user. The user may hear sound played by the earphone clearly and have a perception of external sound information. The bone conduction earphone may convert audios into mechanical vibrations with different frequencies, and use human bones as a medium to transmit the mechanical vibrations, so as to transmit sound waves to cochlear nerve. In this way, the user may receive the sound without passing through an external auditory canal and a tympanic membrane of the ear.

In some embodiments, when the earphone is an open-air conduction earphone, the earphone may also be close to but not blocking the ears of the user. The open-air conduction earphone may form a directional sound field in space through a special design (e.g., forming a pair of dipoles with equal sizes and opposite directions). For example, the open-air conduction earphone may include a diaphragm. Vibrations of the diaphragm may produce sound within an audible range of human ears. A front side and a rear side of the diaphragm may produce a set of opposite-phase sound at the same time. The set of opposite-phase sound may be transmitted to the outside world through sound outlet holes acoustically connected to the front side and the rear side of the diaphragm. One or more sound outlet holes may be located at a position (e.g., a peripheral wall, a bottom wall, or an earphone fixing portion of the core housing described below) where the open-air conduction earphone is close to the ears of the user. For example, the sound outlet holes corresponding to the front side and the rear side of the diaphragm may be located on a same peripheral wall or different peripheral walls of the core housing at the same time. As another example, the sound outlet holes corresponding to the front side of the diaphragm may be located on the peripheral wall of the core housing, and the sound outlet holes corresponding to the rear side of the diaphragm may be located on the earphone fixing portion. As still another example, the sound outlet holes corresponding to the front side and the rear side of the diaphragm may be located on the earphone fixing portion of the core housing at the same time.

In some embodiments, the earphone may be hung on a left ear or a right ear of the user using a single ear hook structure. In this case, the earphone corresponding to a shape of the left ear of the user may be hung at a position of an external auricle of the left ear of the user through an independent left ear hook structure, and the earphone corresponding to a shape of the right ear of the user may be hung at a position of an external auricle of the right ear of the user with an independent right ear hook structure. Since no physical connection structure is between a left ear support structure and a right ear support structure, the user may select to wear the earphone on the left or right ear alone, or wear the earphone on the left and right ears at the same time.

In some embodiments, the earphone may be hung on both ears of the user at the same time using a bilateral ear hook structure. At this time, the ear hook structure corresponding to the left ear of the user and the ear hook structure corresponding to the right ear of the user may be fixedly connected through a physical structure (e.g., a rear hook). More descriptions regarding the specific exemplary structure of the earphone according to some embodiments of the present disclosure may be found later, and not be described herein.

The earphone provided according to some embodiments of the present disclosure is described in detail below in combination with the drawings. It should be noted that, without conflict, a structure described in some embodiments of the present disclosure may include the bone conduction earphone and the air conduction earphone.

In some embodiments, the earphone described in the present disclosure may refer to the bone conduction earphone. The bone conduction earphone may transmit sound waves to the cochlear nerve through tissues (e.g., skin, bones, etc.) without passing through an external auditory canal and eardrum using a bone conduction technique, thus "liberating" the ears of the user and eliminating many operations of the transmission of the sound waves. In some embodiments, the bone conduction earphone may include a wearing assembly and a core module. The core module may be configured to convert electrical signals into mechanical vibrations, and transmit the mechanical vibrations to the cochlear nerve of the user through a bone conduction process. The wearing assembly may be configured to fix the core module on the user's head, so that the core module may be in contact with the user's head, thereby realizing the sound transmission based on the bone conduction technique.

In some embodiments, the earphone described in the present disclosure may also refer to the air conduction earphone. When the earphone is the air conduction earphone, the earphone may include a plurality of sound outlet holes. Sound generated by the earphone may be transmitted to the outside world through the plurality of sound outlet holes. In some embodiments, the sound emitted from different sound outlet holes may have different phases (e.g., opposite or nearly opposite phases). The sound with different phases may interfere and cancel at a specific spatial position, thereby reducing sound leakage of the earphone at the specific spatial position.

It should be noted that when the earphone is the air conduction earphone, except that a sound transmission mode is different from that of the bone conduction earphone, other structures may be designed with reference to the bone conduction earphone. For example, in some embodiments, when the earphone is the air conduction earphone, the earphone may also include the wearing assembly and the core module. The core module may be configured to convert the electrical signals into the mechanical vibrations, and the mechanical vibrations may be transmitted to an eardrum of the user through an air conduction process, thereby stimulating the cochlear nerve of the user. The wearing assembly may be configured to fix the core module near the ears of the user, so that the core module may generate a sound field near the ears of the user, thereby realizing the sound transmission based on the air conduction technique.

In some embodiments, the earphone may include one or two core modules. When the earphone only includes one core module, the wearing assembly may be one-sided wearing (e.g., the single ear hook). For instance, the user may fix the core module near one side of the ear of the user through the ear hook assembly. When the earphone is the bone conduction earphone, the core module may be also in contact with the user's skin. When the earphone includes two core modules, the wearing assembly may be a head-mounted assembly or a bilateral ear hook assembly. For instance, the user may fix the two core modules near the left and right ears of the user through the head-mounted assembly or bilateral ear hook assembly. Similarly, when the earphone is the bone conduction earphone, the two core modules may be in contact with the skin on left and right sides of the user's head, respectively.

In some embodiments, the earphone may be combined with a wearable device. For example, the earphone may be disposed on devices, such as glasses, augmented reality (AR) devices, virtual reality (VR) devices, etc., and the core module may be fixed on the user's head through the earphone. It should be noted that when the earphone is combined with the wearable device, the wearing assembly may refer to a wearing structure of the wearable device.

FIG. 1 is a schematic diagram illustrating an exemplary structure of an earphone 10 according to some embodiments of the present disclosure.

Referring to FIG. 1, in some embodiments, the earphone 10 may include two core modules 20, two ear hook assemblies 30 (equivalent to the wearing assembly), a rear hook assembly 40. In some embodiments, one end of each of the two ear hook assemblies 30 may be connected to a corresponding core module 20. Each of the two ends of the rear hook assembly 40 may be connected to the other end of one of the two ear hook assemblies 30 away from the core module 20. In some embodiments, each of the two ear hook assemblies 30 may be configured to be hung outside an ear of a user. The rear hook assembly 40 may be configured to circumferentially disposed at a rear side of the user's head so as to satisfy requirements that the user wears the earphone 10. Therefore, when the user wears the earphone 10, the two core modules 20 may be located on left and right sides of the user's head, respectively. Under a cooperation between the two ear hook assemblies 30 and the rear hook assembly 40, the two core modules 20 may be in contact with the user's skin by clamping the user's head to transmit sound based on a bone conduction or air conduction technique.

Figure 2:
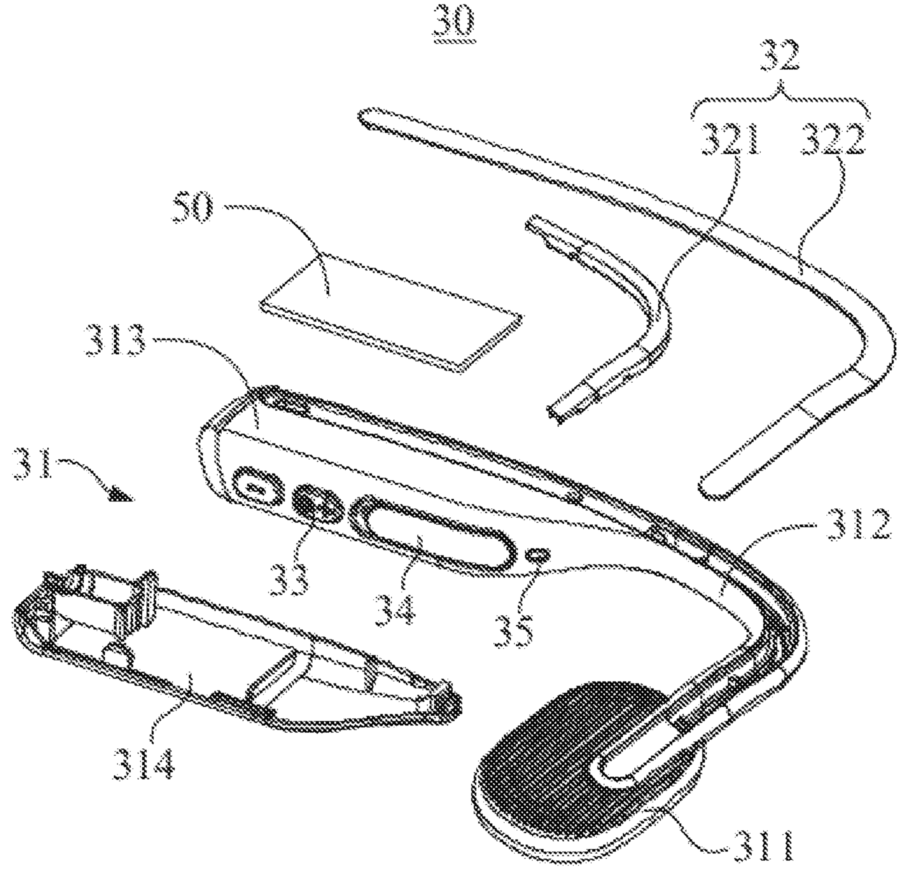
FIG. 2 is a schematic diagram illustrating an exemplary breakdown structure of an earphone according to some embodiments of the present disclosure.
Figure 3:
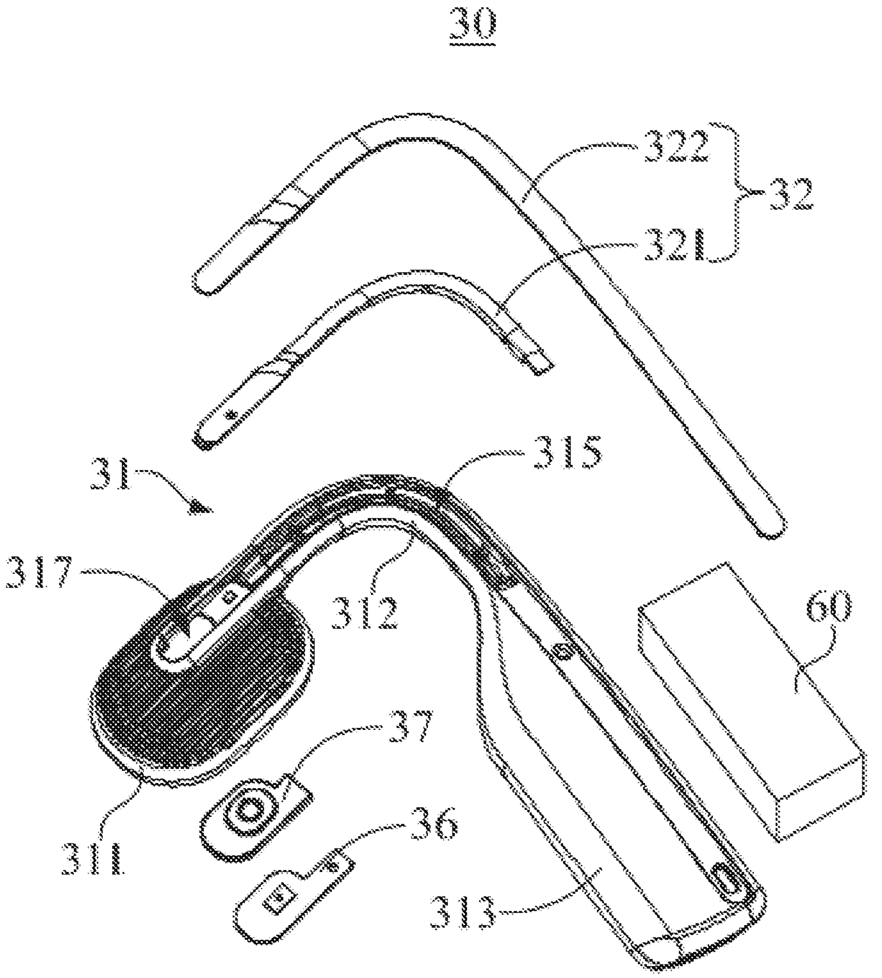
FIG. 3 is a schematic diagram illustrating an exemplary breakdown structure of an earphone according to some embodiments of the present disclosure.

FIG. 2 is a schematic diagram illustrating an exemplary breakdown structure of an earphone according to some embodiments of the present disclosure. FIG. 3 is a schematic diagram illustrating an exemplary breakdown structure of an earphone according to some embodiments of the present disclosure.

Referring to FIGS. 2 and 3, the earphone 10 may also include a main control circuit board 50 and a battery 60. In some embodiments, the main circuit board 50 and the battery 60 may be disposed in a same ear hook assembly 30. Alternatively, the main control circuit board 50 and the battery 60 may be disposed in each of the two ear hook assemblies 30, respectively. More descriptions regarding the structure may be found later. In some embodiments, the main control circuit board 50 and the battery 60 may be connected with the two core modules 20 through a conductor (e.g., a leading wire). The main control circuit board 50 may be configured to cause the core modules 20 to generate sound (e.g., convert electrical signals to mechanical vibrations). The battery 60 may be configured to supply power to a portion of the earphone 10 (e.g., the two core modules 20). The earphone 10 may further include a microphone (e.g., a microphone, a pickup, etc.), a communication unit (e.g., a Bluetooth, etc.), etc., which may also be connected with the main control circuit board 50 and the battery 60 to achieve a corresponding function.

It should be noted that when an accommodation bin 313 shown in FIG. 2 is configured to accommodate the main circuit board 50, the accommodation bin 313 shown in FIG. 3 may be configured to accommodate the battery 60. At this time, if the ear hook assembly 30 shown in FIG. 2 corresponds to a left ear hook of the bone conduction earphone 10, the ear hook assembly 30 shown in FIG. 3 may correspond to a right ear hook of the bone conduction earphone 10. Alternatively, if the ear hook assembly 30 shown in FIG. 2 corresponds to the right ear hook of the bone conduction earphone 10, the ear hook assembly 30 shown in FIG. 3 may correspond to the left ear hook of the bone conduction earphone 10. In other words, the main control circuit board 50 and the battery 60 may be disposed in two ear hook assemblies 30, respectively. Therefore, a capacity of the battery 60 may be increased to improve a battery life of the earphone 10. A weight of the earphone 10 may be balanced to improve the wearing comfort of the earphone 10. In some embodiments, the main control circuit board 50 and the battery 60 may be connected to the wires of the rear hook assembly 40, and the specific configuration will be described in detail later. In some embodiments, when the earphone 10 includes a single ear hook, volumes of the main control circuit board 50 and the battery 60 may be adaptively reduced to accommodate the main control circuit board 50 and the battery 60 in a same accommodation bin.

It should be noted that there may be two core modules 20, and both of the two core modules 20 may generate sound. Therefore, the earphone 10 may achieve a stereo sound effect, thereby improving a favorability of the user of the earphone 10. Therefore, in some other application scenarios where stereo requirements are not particularly high, such as a hearing aid for hearing patients, a reminding a host during a live broadcast, etc., the earphone 10 may include only one core module 20. In some embodiments, structures of the two core module 20 included in the earphone 10 may be the same or different. In some embodiments, the conductor may include a leading wire for an electrical connection between various electronic components of the earphone 10. If multiple circuits are required to be electrically connected, the conductor may be a multistrand structure. For example, the conductor may include a plurality of leading wires.

As shown in FIG. 2, the ear hook assembly 30 may include an ear hook housing 31 and a decoration member 32. The ear hook housing 31 and the decoration member 32 may be connected through a glue connection, a clamping connection, a threaded connection, or the like, or any combination thereof. When a user wears the earphone 10, the decoration member 32 may be located on one side of the ear hook housing 31 facing away from the core module 20. For example, the decoration member 32 may be located at an outside of the earphone 10 to facilitate the decoration member 32 to decorate the ear hook housing 31, thereby increasing an appearance of the earphone 10. In some embodiments, the decoration member 32 may be protruded from the ear hook housing 31. Alternatively, the decoration member 32 may be embedded in the ear hook housing 31. In some embodiments, the decoration member 32 may include a sticker, a plastic piece, a metal piece, or the like, or any combination thereof. The decoration member 32 may be printed with a geometric pattern, a cartoon pattern, a logo pattern, etc. Alternatively, the decoration member 32 may also apply a fluorescent material, a reflective material, etc., to achieve the corresponding decoration effect.

As shown in FIG. 2 and FIG. 3, the ear hook housing 31 may include an earphone fixing portion 311, a bending transition portion 312, and the accommodation bin 313 that are sequentially connected. The earphone fixing portion 311 may be configured to fix the core module 20. A cooperation between the earphone fixing portion 311 and the core module 20 may be described in detail later. The bending transition portion 312 may be configured to connect the accommodation bin 313 and the earphone fixing portion 311. The bending transition portion 312 may be bent and disposed to be hung outside a human ear. Further, one end of the accommodation bin 313 away from the earphone fixing portion 311 may be connected to the rear hook assembly 40 by a connection (e.g., a glue connection, a clamping connection, a threaded connection, or the like, or any combination thereof) to connect the ear hook component 30 and the rear hook assembly 40. One end of the accommodation bin 313 may be disposed with an opening to accommodate the main control circuit board 50 and/or the battery 60. In some embodiments, the ear hook housing 31 may further include a bin cover 314. The bin cover 314 may be disposed on an opening end of the accommodation bin 313.

As shown in FIG. 2, in some embodiments, the ear hook assembly 30 may further include a control key 33 and an interface 34 (e.g., a Type-C interface, a universal serial bus (USB) interface, a lighting interface, etc.). When the accommodation bin 313 accommodates the main control circuit board 50, the control key 33 and the interface 34 may be disposed on the accommodation bin 313, so that the control key 33 and the interface 34 may be connected with the main control circuit board 50, thereby shortening a distance of a wiring. In some embodiments, the control key 33 and the interface 34 may be partially exposed to the ear hook housing 31 to facilitate the user to perform a corresponding operation. Therefore, the control key 33 may be configured to turn on/off the earphone 10, adjust a volume, etc. The interface 34 may be configured to transmit data, charge, etc. In some embodiments, the ear hook assembly 30 may further include an indicator light 35. The indicator light 35 may be disposed on the accommodation bin 313 to be connected with the main control circuit board 50, thereby shortening the distance of the wiring. For example, the indicator light 35 may be partially exposed to the ear hook housing 31. In some embodiments, the indicator light 35 may further include a light emitting diode (LED) light source hiding in the ear hook housing 31 and a light guide member partially exposed outside the ear hook housing 31 (not shown in FIG. 2 and FIG. 3). Therefore, the indicator light 35 may be configured to prompt the user in a scenario that the earphone 10 is charging, the power of the earphone 10 is insufficient, etc. In some embodiments, the indicator light 35 may flash at a preset frequency, thereby transmitting preset information corresponding to the preset frequency to the user as an output device. In some embodiments, the control key 33 may be replaced with another form of a control interface. For example, a sensing device (e.g., a pressure sensor) may be mounted on a side wall of the earphone fixing portion 311 or the core housing, and the user may send instructions to the main control circuit board 50 by touching, clicking, or sliding on a surface. Exemplary instructions may include playing/pausing music, skipping a current playing track, adjusting (increasing or decreasing a volume), answering/rejecting an incoming call, or the like, or any combination thereof.

It should be noted that when a user wears the earphone 10, the earphone 10 may be hung outside the human ear. For example, the core module 20 may be located on a front side of the human ear. The main control circuit board 50 or the battery 60 may be located on a rear side of the human ear. For example, the human ear may be a fulcrum to support the earphone 10. Therefore, most of the weight of the earphone 10 may be bored by the human ear. It may be uncomfortable for the user after wearing the earphone 10 for a long time. To this end, in some embodiments, a soft material may be selected as a material of the ear hook housing 31 (especially the bending transition portion 312), so that a wearing comfort of the earphone 10 may be improved. In some embodiments, the material of the ear hook housing 31 may include polycarbonate (PC), polyamide (PA), acrylonitrile-butadiene-styrene copolymer (ABS), polystyrene (PS), high impact polystyrene (HIPS), polypropylene (PP), polyethylene terephthalate (PET), Polyvinyl chloride (PVC), polyurethanes (PU), polyethylene (PE), phenol formaldehyde (PF), urea-formaldehyde (UF), melamine-formaldehyde (MF), silica gel, or the like, or any combination thereof. In some embodiments, since the material of the ear hook housing 31 is soft, a rigidity of the ear hook housing 31 may be insufficient. A structure of the ear hook housing 31 may not be maintained under an external force. The ear hook housing 31 may be broken since an insufficient strength. To this end, an elastic metal wire (not shown in FIG. 3) may be disposed in the ear hook housing 31 (at least the bending transition portion 312) to improve the strength of the ear hook housing 31, thereby increasing the reliability of the ear hook housing 31. In some embodiments, a material of the elastic metal wire may include spring steel, titanium alloy, titanium nickel alloy, chromium molybdenum steel, or the like, or any combination thereof. In some embodiments, the ear hook housing 31 may be a structured piece integrally formed by metal insert injection molding.

Based on the above detailed description, since the core module 20 is disposed at one end of the ear hook assembly 30 (e.g., one end of the earphone fixing portion 311), the main control circuit board 50 or the battery 60 may be disposed on the other end of the ear hook assembly 30 (e.g., the other end of the accommodation bin 313). Therefore, when the core module 20 is connected with the main control circuit board 50 and the battery 60 through a leading wire, the leading wire may at least pass through a region where the bending transition portion 312 is located. In some embodiments, in order to the appearance of the earphone 10, the leading wire may not be exposed to the ear hook housing 31, but passed through the ear hook housing 31, so that the bending transition portion 312 may at least cover the leading wire. However, since the material of the leading wire is soft, it may be difficult for the leading wire to pass through the ear hook housing 31. To this end, as shown in FIG. 3, in some embodiments, a first groove 315 may be disposed on the ear hook housing 31 (at least on the bending transition portion 312). The first groove 315 may be configured for wiring to reduce the difficulty that the leading wire passes through the ear hook housing 31. The first groove 315 may be disposed on one side of the ear hook housing 31 near the decoration bracket 321. In some embodiments, the decoration member 32 may be embedded and fixed in the first groove 315 corresponding to the bending transition portion 312 to form a wiring channel (not shown in FIG. 2 and FIG. 3). Therefore, the leading wire may extend into the accommodation bin 313 through the wiring channel in the core module 20, so that the core module 20 may be connected with the main control circuit board 50 and the battery 60 through the leading wire. Therefore, when the leading wire passes through the ear hook housing 31 through the first groove 315, the decoration member 32 may cover the leading wire to avoid the leading wire naked outside the ear hook housing 31. In some embodiments, the decoration member 32 may be configured to decorate the ear hook housing 31, and hide the leading wire, so that the decoration member 32 may achieve "one piece with dual purposes."

As shown in FIG. 2 and FIG. 3, in some embodiments, the decoration member 32 may include a decoration bracket 321 and a decoration strip 322. The decoration bracket 321 may be bent and disposed corresponding to the bending transition portion 312. Therefore, when the decoration bracket 321 is embedded and fixed in the first groove 315 corresponding to the bending transition portion 312, the decoration bracket 321 and the first groove 315 on the bending transition portion 312 may be fitted to form a wiring channel. The leading wire may extend from the core module 20 to the accommodation bin 313 through the wiring channel. In some embodiments, the decoration strip 322 may be embedded in the first groove 315 and fixed to the decoration bracket 312. The decoration bracket 321 may include a plastic piece. The decoration bracket 321 may be assembled with the ear hook housing 31 by a glue connection and/or a clamping connection. The decoration strip 322 may include a sticker. The decoration strip 322 may be attached to the decoration bracket 312 by a glue connection. Therefore, when the user alters the decoration effect of the decoration member 32, the decoration strip 322 may be altered without removing the whole decoration member 32 from the ear hook housing 31.

As shown in FIG. 3, in some embodiments, the ear hook assembly 30 may further include a button 36. A button adaptation hole 317 may be disposed on the ear hook housing 31. The button adaptation hole 317 may be configured to accommodate a portion of a volume of the button 36. A hole size and a shape of the button adaptation hole 317 may be set according to a shape and a size of the button 36, so that the button 36 may be fixed in the button adaptation hole 317, and a protrusion height of the button 36 relative to the ear hook housing 31 may be reduced. The decoration bracket 321 may be fixed on one side of the ear hook housing 31. The button 36 may be disposed on the other side of the ear hook housing 31 facing away from the decoration bracket 321, and exposed through the button adaptation hole 317. The decoration bracket 321 may further extend in a form of a cantilever above the button 36 exposed through the button adaptation hole 317. The button 36 may be triggered when pressed by an external force. Therefore, the button 36 may be used to replace the above control key 33 to simplify the structure of the earphone 10. Alternatively, the button 36 may coexist with the above control key 33. The button 36 may be configured to play/pause the earphone 10, wake up by artificial intelligence (AI), etc., so as to expand an interaction of the earphone 10.

In some embodiments, the button adaptation hole 317 may be disposed the earphone fixing portion 311. The button 36 may be pressed on the earphone fixing portion 311 by the user. At this time, the ear hook assembly 30 may further include a sealing component 37. The sealing component 37 may be disposed between the button 36 and the earphone fixing portion 311. In some embodiments, a material of the sealing component 37 may include silica gel, rubber, or the like, or any combination thereof. Therefore, a waterproof performance of the earphone fixing portion 311 at a region where the button 36 is located may be increased. A pressing touch of the button 36 may also be improved.

In some embodiments, when the core module 20 is disposed at one end of the ear hook assembly 30 (e.g., one end where the earphone fixing portion 311 is located) and the battery 60 is disposed on the other end of the ear hook assembly 30 (e.g., the other end where the accommodation bin 313 is located), the leading wire may at least pass through the region where the bending transition section 312 is located so that the core module 20 may be connected with the battery 60 through the leading wire. As shown in FIG. 3, the first groove 315 may be disposed on at least one side of the earphone fixing portion 311 and the bending transition portion 312 close to the decoration bracket 321. The first groove 315 may be configured for wiring to reduce the difficulty of disposing of the leading wire in the ear hook housing 31. Further, one end of the first groove 315 may be in communication with the button adaptation hole 317. When the decoration bracket 321 is embedded and fixed to the first groove 315, the decoration bracket 321 may also cover the button adaptation hole 317. When the region where the button 36 is located (including at least a portion of the decoration bracket 321) is pressed, the button 36 mounted in the button adaptation hole 317 may be triggered through the decoration bracket 321.

Through the above manner, the decoration member 32 may be configured to decorate the ear hook housing 31, shield the leading wire, shield the button 36, and trigger the button 36, so that the decoration member 32 may achieve "one piece with four functions."

Figure 4:
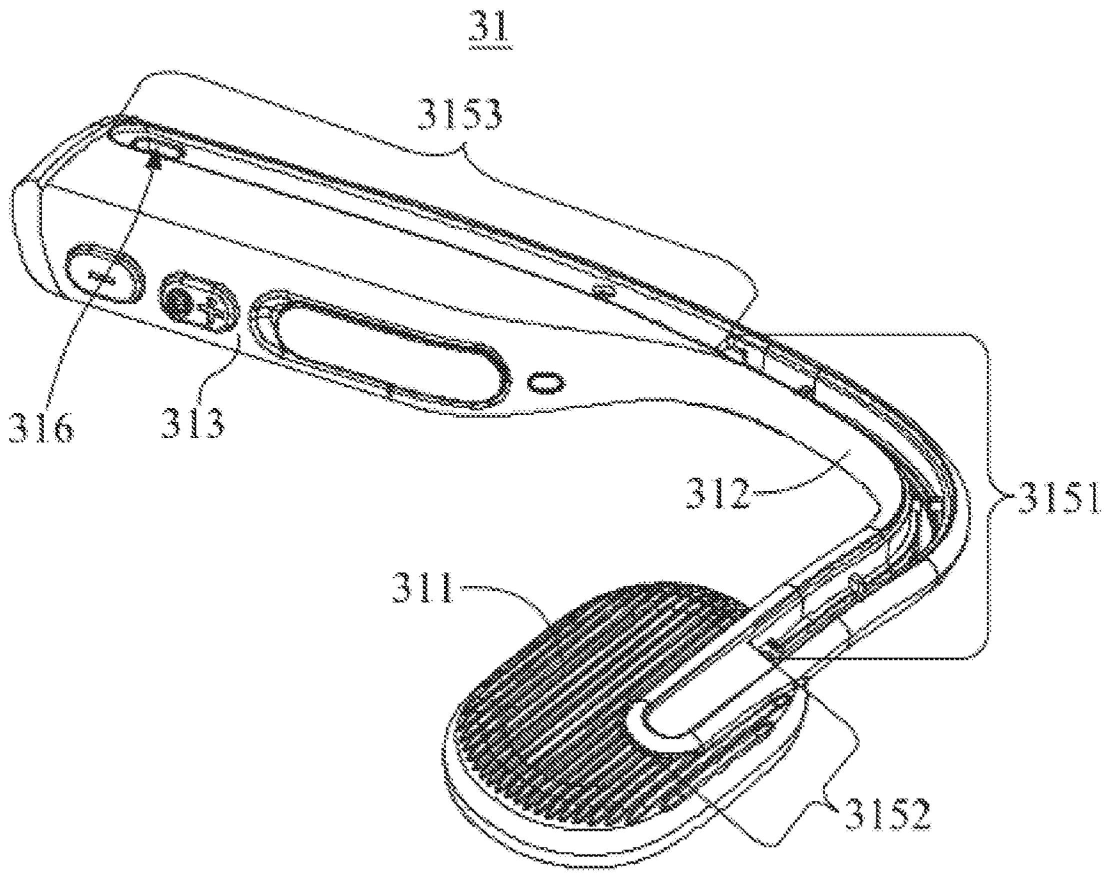
FIG. 4 is a schematic diagram illustrating an exemplary structure of an ear hook housing of an earphone according to some embodiments of the present disclosure.
Figure 5:
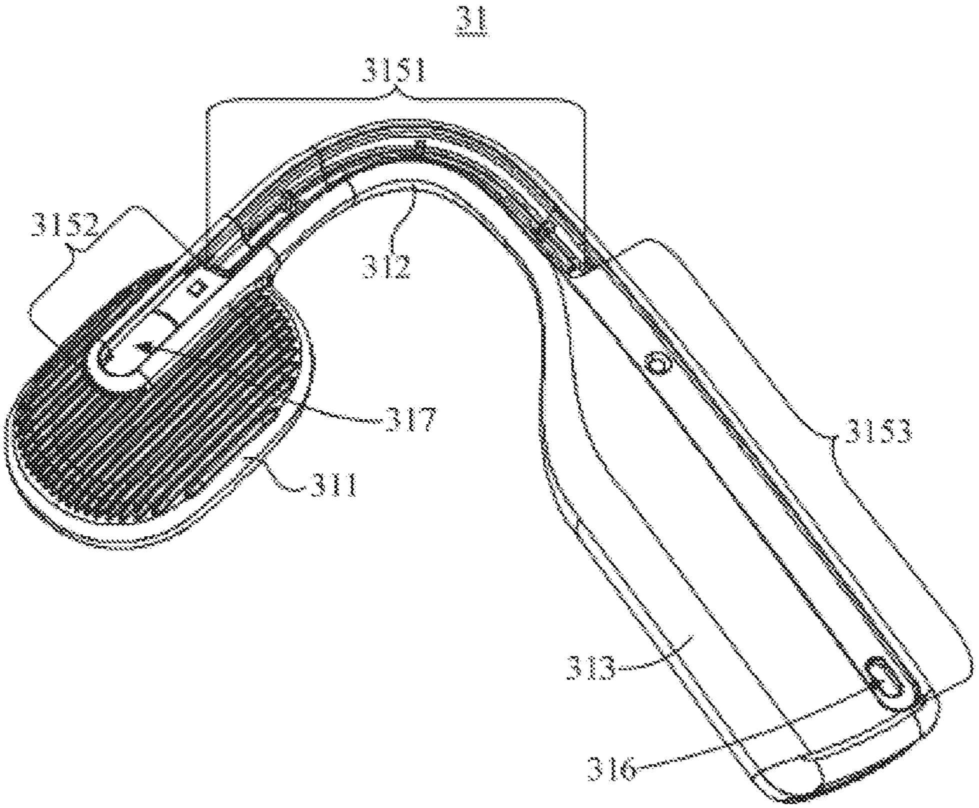
FIG. 5 is a schematic diagram illustrating an exemplary structure of an ear hook housing of an earphone according to other embodiments of the present disclosure.

FIG. 4 is a schematic diagram illustrating an exemplary structure of an ear hook housing of an earphone according to some embodiments of the present disclosure. FIG. 5 is a schematic diagram illustrating an exemplary structure of an ear hook housing of an earphone according to other embodiments of the present disclosure.

Referring to in FIG. 4, in some embodiments, a pit 316 may be disposed at a position of a bottom portion of the first groove 315. When the decoration strip 322 is pressed into the pit 316 by the user, a portion of the decoration strip 322 away from the pit 316 may be lifted from the first groove 315 which facilitates the replacement of the decoration strip 322. In some embodiments, the first groove 315 may further extend to the accommodation bin 313. The pit 316 may be disposed on the accommodation bin 313. The pit 316 may be located outside a region that the decoration bracket 321 covers the first groove 315. The decoration strip 322 may be fitted and fixed to the decoration bracket 321 and cover the pit 316. At this time, an overall length of the decoration strip 322 may be greater than an overall length of the decoration bracket 321.

It should be noted that the decoration bracket 321 and the decoration strip 322 may also be a structural member integrally formed. The material of the decoration bracket 321 may be different from the material of the decoration strip 322. The decoration bracket 321 and the decoration strip 322 may be formed by two-color injection molding such that the decoration bracket 321 may function as a support and the decoration strip 322 may function as a decoration. For example, the overall length of the decoration strip 322 may be greater than or equal to the overall length of the decoration bracket 321.

As shown in FIGS. 4 and 5, the first groove 315 may be divided into the first sub-groove section 3151 located on the bending transition portion 312 and the second sub-groove section 3152 located on the earphone fixing portion 311. In some embodiments, a depth of the first sub-groove section 3151 may be greater than a depth of the second sub-groove section 3152. The first sub-groove section 3151 may be configured to accommodate the leading wire extending from the core module 20. The leading wire extending from the core module 20 may pass through an adjacent position between the first sub-groove section 3151 and the second sub-groove section 3152, and extend to the first sub-groove section 3151. The second sub-groove section 3152 and the first sub-groove section 3151 may be configured together to accommodate the decorative bracket 321.

Referring to FIGS. 4 and 5, in some embodiments, the first groove 315 may be divided into the first sub-groove section 3151 located on the bending transition portion 312, the second sub-groove 3152 located on the earphone fixing portion 311, and a third sub-groove section 3153 located on the accommodation bin 313. The depth of the first sub-groove section 3151 may be greater than both the depth of the second sub-groove section 3152 and a depth of the third sub-groove section 3153. Therefore, the second sub-groove section 3152 and the third sub-groove section 3153 may be configured to accommodate the decoration strip 322. While accommodating the decoration strip 322, the first sub-groove section 3151 may further accommodate the leading wire connecting the core module 20 and the accommodation bin 313. In other words, the decoration strip 322 may not only be located in the first sub-groove section 3151, but also extend into the second sub-groove section 3152 and the third sub-slot section 3153. The pit 316 may be disposed in the third sub-groove section 3153. In some embodiments, the depth of the second sub-groove section 3152 may be equal to the depth of the third sub-groove section 3153. After the decoration bracket 321 is embedded and fixed to the first sub-groove section 3151, a surface of the decoration bracket 321 facing away from the ear hook housing 31 may be substantially flat to a groove bottom of the second sub-groove section 3152 and a groove bottom of the third sub-groove section 3153, so that the decoration strip 322 may be flatly attached to the earphone fixing portion 311, the decoration bracket 321, and the accommodation bin 313.

In some embodiments, a bonding strength between the decoration strip 322 and the decoration bracket 321 may be less than a fixing strength between the decoration bracket 321 and the bending transition portion 312. When the decoration strip 322 is glued to the decoration bracket 321, the bonding strength may refer to a glue strength between the decoration strip 322 and the decoration bracket 321. At this time, a size of the bonding strength may depend on a roughness of a glued surface of the decoration bracket 321, a roughness of a glued surface of the decoration strip 322, and/or an amount (and/or a viscosity) of a glue between the decoration strip 322 and the decoration bracket 321. In some embodiments, when the decoration bracket 321 is clamped with the bending transition portion 312, the fixing strength may refer to a clamping strength between the decoration bracket 321 and the bending transition portion 312. At this time, the fixing strength may depend on a fit clearance between the decoration bracket 321 and the bending transition portion 312, and/or a depth of the clamping between the decoration bracket 321 and the bending transition portion 312. Therefore, when the decoration bracket 321 and the ear hook housing 31 are assembled by a clamping connection, two ends of the decoration strip 322 may be further glued with the accommodation bin 313 and the earphone fixing portion 311, respectively, to further fix the decoration bracket 321. When the decoration bracket 321 is replaced to change the decoration effect of the decoration member 32, the decoration bracket 321 may not be brought by the excessive bonding strength between the decoration bracket 321 and the decoration strips 322.

Referring to FIG. 5, in some embodiments, the button adaptation hole 317 may be disposed in the second sub-groove section 3152. That is, projections of the button adaptation hole 317 and the second sub-groove section 3152 on the earphone fixing portion 311 may be at least partially overlapped. In some embodiments, the decoration strip 322 may not only be located in the first sub-groove section 3151 and the second sub-groove section 3152, but also extend into the third sub-groove section 3153. For example, after the decoration bracket 321 is embedded and fixed to the first sub-groove section 3151, a surface of the decoration bracket 321 facing away from the ear hook housing 31 may be substantially flat to the groove bottom of the third sub-groove section 3153. Therefore, the decoration strip 322 may be flatly attached to the earphone fixing portion 311, the decoration bracket 321, and the accommodation bin 313. The decoration bracket 321 may form a cantilever at a position of the second sub-groove section 3152 corresponding to the button adaptation hole 317, thereby strengthening a structural strength of the second sub-groove section 3152.

Figure 6:
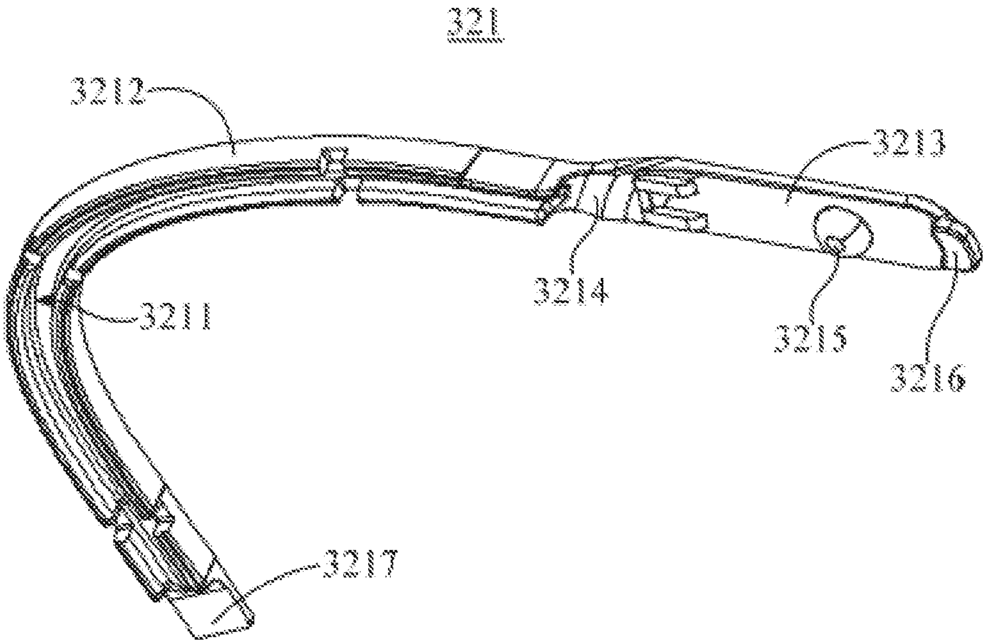
FIG. 6 is a schematic diagram illustrating a structure of a decoration bracket of an earphone according to some embodiments of the present disclosure.
Figure 7:
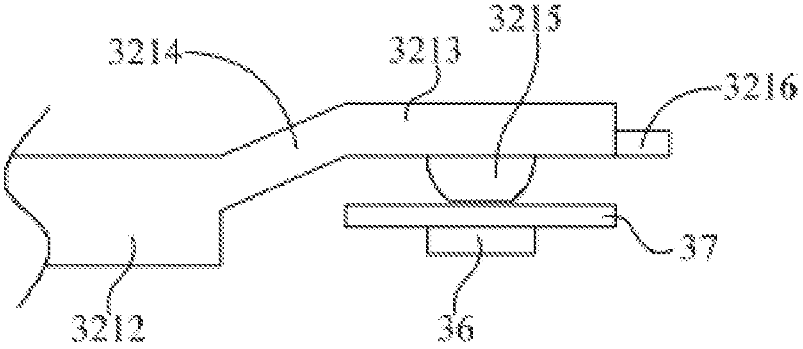
FIG. 7 is a schematic diagram illustrating a structure of a decoration bracket of an earphone according to some embodiments of the present disclosure.

FIG. 6 is a schematic diagram illustrating a structure of a decoration bracket of an earphone according to some embodiments of the present disclosure. FIG. 7 is a schematic diagram illustrating a structure of a decoration bracket of an earphone according to some embodiments of the present disclosure.

As shown in FIG. 6, in some embodiments, a second groove 3211 may be disposed on one side of the decoration bracket 321 toward the ear hook housing 31. Therefore, when the decoration bracket 321 is embedded and fixed to the first groove 315 on the decorative bracket 321, the second groove 3211 and the first groove 315 may cooperate with each other to form a wiring channel.

In some embodiments, the decoration bracket 321 may include a fixing portion 3212 corresponding to the first sub-groove section 3151 and a pressing portion 3213 corresponding to the second sub-groove section 3152. A thickness of the fixing portion 3212 may be greater than a thickness of the pressing portion 3213, so that the fixing portion 3212 may be configured to assemble the decoration bracket 321 and the ear hook housing 31. The pressing portion 3213 may be configured to trigger the button 36. Further, when the second groove 3211 is disposed on one side of the decoration bracket 321 toward the ear hook housing 31, the second groove 3211 may be disposed on the fixing portion 3212.

As shown in FIG. 6 and FIG. 7, the decoration bracket 321 may further include a connection portion 3214 connected between the fixing portion 3212 and the pressing portion 3213. In some embodiments, the connection portion 3214 may be bent and extended toward aside away from the ear hook housing 31 relative to the fixing portion 3212. The pressing portion 3213 may be bent and extended toward a side close to the ear hook housing 31 relative to the fixing portion 3212. At this time, the connection portion 3214 may cause the pressing portion 3213 to be suspended relative to the fixing portion 3212. There may be a certain distance between the pressing portion 3213 and the fixing portion 3212. The distance may be greater than or equal to a trigger stroke of the button 36. Therefore, a problem that when one end of the decoration bracket 321 (e.g., one end of the pressing portion 3213) is pressed by the user, the other end of the decorative bracket 321 is lifted may be effectively improved.

In some embodiments, one side of the pressing portion 3213 close to the ear hook housing 31 may also be disposed with a button protrusion 3215. Therefore, when the pressing portion 3213 is pressed by an external force, the button protrusion 3215 may trigger the button 36. Projections of the button protrusion 3215 and the button 36 may be at least partially overlapped on the earphone fixing portion 311. A valid area of the button protrusion 3215 in contact with the button 36 may be less than a valid area of the pressing portion 3213 in contact with the button 36. Therefore, a trigger difficulty of the button 36 may be reduced. For example, when the sealing component 37 is disposed between the earphone fixing unit 311 and the button 36, a relationship between an external force applied by the user and a valid area of a region of the sealing component 37 deformed may be determined according to Equation (1):

$$F \propto \varepsilon \times S. \tag{1}$$

Since the sealing component 37 is deformed first before the button 36 is triggered, in a case where a same external force F is applied by the user, if a valid area S of a region of the sealing component 37 deformed is smaller, a deformation ε generated by the sealing component 37 may be greater, which may more easily trigger the button 36. In some embodiments, the button protrusion 3215 may reduce the valid area compared to the pressing portion 3213.

In some embodiments, a blocking portion 3216 may be disposed on an end portion of the decoration bracket 321 close to the earphone fixing portion 311. The blocking portion 3216 may be configured to form a block on an inner surface of the fixing portion 311 facing away from the decoration bracket 321 to prevent the end portion of the decoration bracket 321 from being lifted from the first groove 315, for example, under an external force. As shown in FIG. 7, the blocking portion 3216 may be disposed at one end of the pressing portion 3213 away from the fixing portion 3212. At this time, due to a blocking effect between the blocking portion 3216 and the earphone fixing portion 311, after the decoration bracket 321 is deformed under the external force to trigger the button 36, the decoration bracket 321 may not be lifted due to an excessive elastic recovery.

Referring to FIG. 6, in some embodiments, a clinch portion 3217 may be disposed on one end of the decoration bracket 321 close to the accommodation bin 313 (e.g., the other end of the decoration bracket 321 away from the pressing portion 3213). A thickness of the clinch portion 3217 may be less than the thickness of the fixing portion 3212. Therefore, the clinch portion 3217 may be configured for structural avoidance with the reinforcing structure of the ear hook housing 31 (e.g., located between the bending transition portion 312 and the accommodation bin 313).

Figure 8:
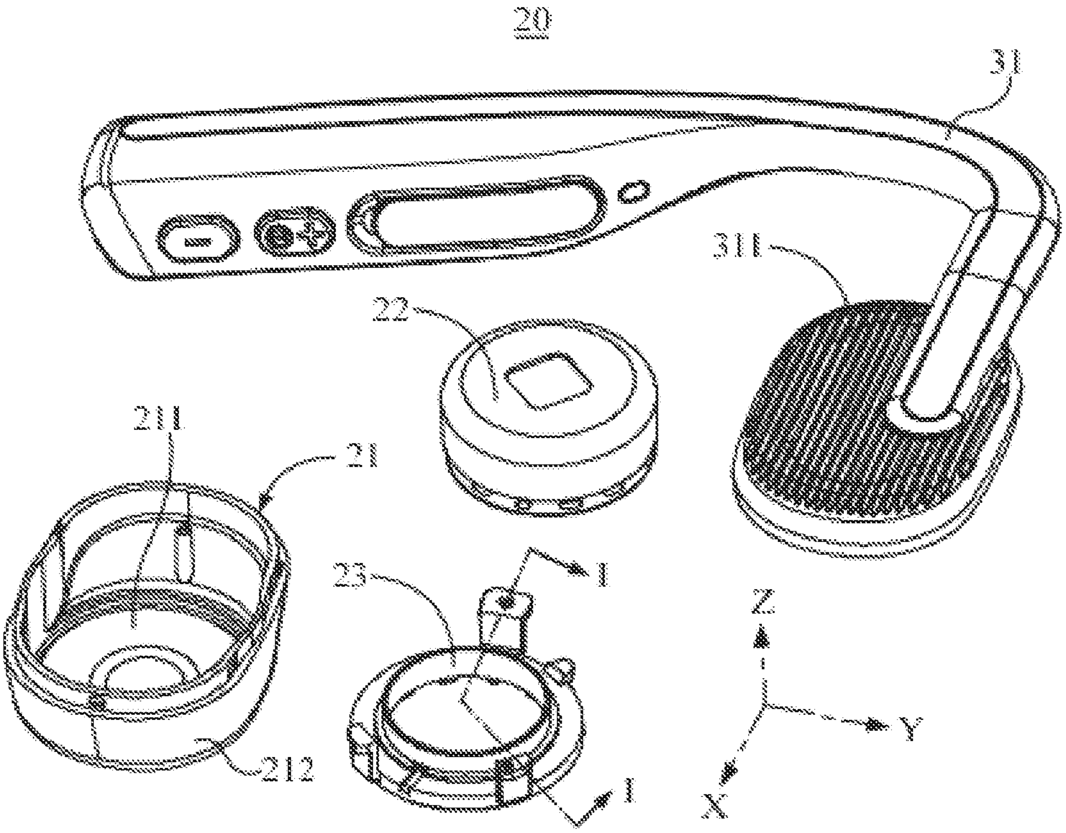
FIG. 8 is a schematic diagram illustrating a breakdown structure of an earphone according to some embodiments of the present disclosure.

FIG. 8 is a schematic diagram illustrating a breakdown structure of an earphone according to some embodiments of the present disclosure.

Referring to FIG. 8, the core module 20 may include a core housing 21 and a core 22. In some embodiments, one end of the core housing 21 may include an opening. The ear hook housing 31 (e.g., the earphone fixing portion 311) may be disposed on an opening end of the core housing 21 (e.g., the end of the core housing 21 with the opening) to form a chamber structure for accommodating the core 22. In some embodiments, the ear hook housing 31 may be equivalent to a cover of the core housing 21. Therefore, compared to an insertion assembly of the ear hook structure and the core structure, a cover assembly of the ear hook housing 31 and the core housing 21 according to some embodiments of the present disclosure may improve a stress problem of an insertion position of the ear hook structure and the core structure, thereby increasing the reliability of the earphone 10.

It should be noted that when the earphone is the bone conduction earphone, the core 22 may be configured to convert electrical signals into mechanical vibration and transmit the mechanical vibrations to the user's cochlear nerve through a bone conduction process. When the earphone is the air conduction earphone, the core 22 may be configured to convert the electrical signals into the mechanical vibration and transmit the mechanical vibrations to the user's eardrum through an air conduction process, so as to stimulate the user's cochlear nerve. It should be also noted that the ear hook housing schematically described in FIG. 8 is merely for illustration of a relative position relationship between the ear hook housing and the core housing, which may further implicitly indicate a possible assembly between the ear hook housing and the core housing.

In some embodiments, when the earphone is the bone conduction earphone, the core 22 may be directly or indirectly fixed to the core housing 21, so that the core 22 may generate vibrations under an excitation of the electrical signal. The core housing 21 may be driven to vibrate with the vibrations. When the user wears the earphone 10, the skin contact region of the core housing 21 (e.g., a bottom wall 211 described later) may be in contact with the user's skin, so that the vibrations may be transmitted to the cochlear nerve through tissues, such as the human skull, the human skin, etc. Furthermore, the user may hear the sound played by the earphone 10. In some embodiments, the core module 20 may further include a core bracket 23. The core bracket 23 may be configured to fix the core 22 in the core housing 21.

Figure 9:
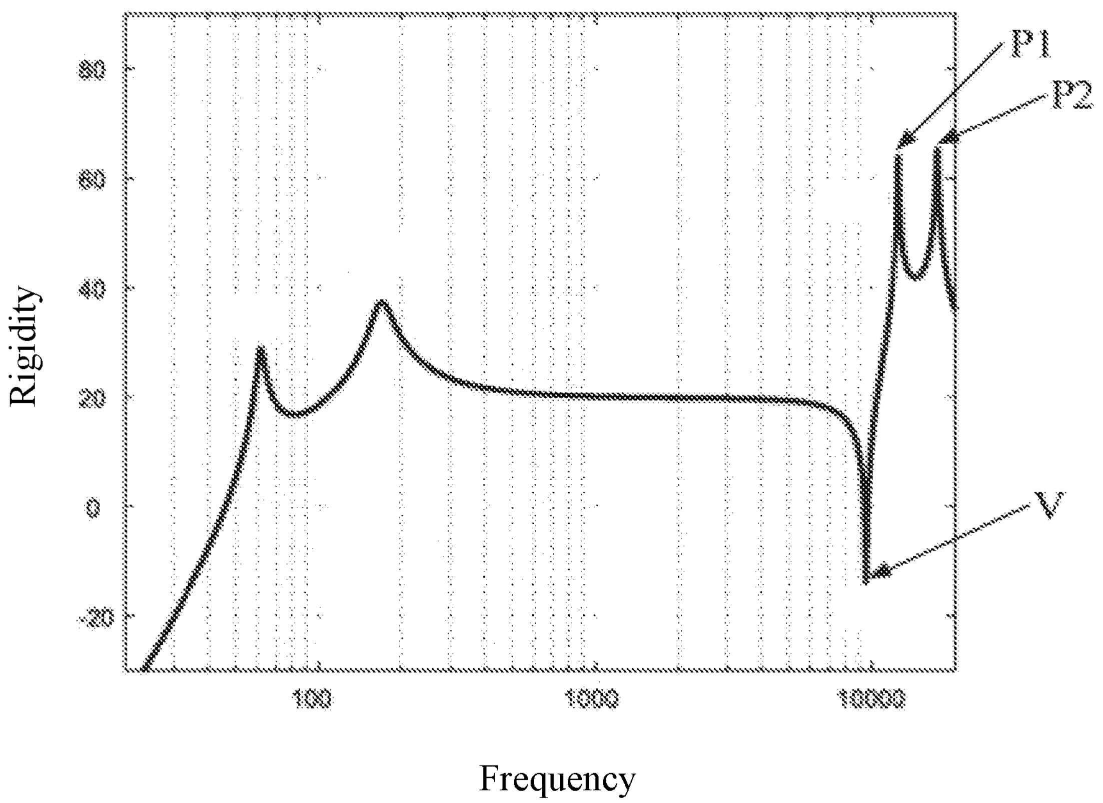
FIG. 9 is a schematic diagram illustrating a frequency response curve of an earphone according to some embodiments of the present disclosure.

FIG. 9 is a schematic diagram illustrating a frequency response curve of an earphone according to some embodiments of the present disclosure.

Generally, a low frequency may refer to a sound with a frequency less than 500 Hz. A medium frequency may refer to a sound with a frequency within a range from 500 to 4000 Hz. A high frequency may refer to a sound with a frequency greater than 4000 Hz. In some embodiments, as shown in FIG. 9, a horizontal axis may represent a frequency of vibrations. A unit of the horizontal axis may be hertz (Hz). A longitudinal axis may represent an intensity of the vibrations. A unit of the longitudinal axis may be decibel (dB). A high frequency region (e.g., a range greater than 4000 Hz) may include a first high frequency valley V, a first high frequency peak P1, and a second high frequency peak P2. In some embodiments, the first high frequency valley V and the first high frequency peak P1 may be generated by a deformation of a non-skin contact region of the core housing 21 (e.g., an annular peripheral wall 212 described later) under the high frequency. The second high frequency peak P2 may be generated by a deformation of a skin contact region of the core housing 21. A frequency response curve in a frequency range from 500 to 6000 Hz may be critical to the bone conduction earphone. In the frequency range, it may not be desirable to have sharp peaks. The flatter the frequency response curve, the better the sound quality of the bone conduction earphone. The larger the rigidity, the less the structure deformation generated under a force, and a resonance with a higher frequency may be generated. Therefore, the first high frequency valley V, the first high frequency peak P1, and the second high frequency peak P2 may be moved toward a region with a higher frequency by increasing the rigidity of the core housing 21.

In other words, in order to obtain a better quality of the sound, the rigidity of the core housing 21 may be as large as possible. To this end, in some embodiments, a material of the core housing 21 may include a mixture of at least one material such as polycarbonate, polyamide, acrylonitrile-butadiene-styrene copolymer, etc., and glass fibers and/or carbon fibers. In some embodiments, the material of the core housing 21 may include a mixture of the carbon fibers and polycarbonate in a certain proportion, a mixture of the glass fibers and polycarbonate in another proportion, or a mixture of the glass fibers and the polyamide in yet another proportion. In some embodiments, the material of the core housing 21 may include a mixture of the carbon fibers, the glass fibers, and polycarbonate in a certain proportion. In some embodiments, after different proportions of the carbon fibers and/or glass fibers are added, elastic moduli of the materials may be different, which may also result in different rigidities of the core housing 21. For example, 20% to 50% of glass fibers may be added to polycarbonate. An elastic modulus of the material may be 6 to 8 GPa.

Based on the detailed description, the ear hook housing 31 (e.g., the earphone fixing portion 311) may be a portion of the core module 20 to form a chamber structure for accommodating the core 22. In some embodiments, in order to improve the wearing comfort of the bone conduction earphone, the ear hook housing 31 may select a soft material so that the rigidity of the ear hook housing 31 may be reduced. Therefore, when the ear hook housing 31 is covered the core housing 21 to form the chamber structure for accommodating the core 22, since the rigidity of the ear hook housing 31 (e.g., the earphone fixing portion 311) is less than the rigidity of the core housing 21 (e.g., when a difference between the rigidity of the ear hook housing 31 and the rigidity of the core housing 21 is too large, the frequency response of the ear hook housing 31 may be greatly different from the frequency response of the core housing 21 (e.g., positions of resonance peaks are far different), so that sound generated by the ear hook housing 31 may not effectively offset a sound leakage caused by the vibration of the core housing 21), the bone conduction earphone may easily leak the sound, which may further affect the favorability of the user.

Generally, a resonant frequency of a structure may be related to the rigidity of the structure. Under a same mass, the larger the rigidity of the structure, the higher the resonant frequency. In some embodiments, the rigidity K of the structure may be related to a material (e.g., an elastic modulus), a structure form, etc., of the structure. In some embodiments, the greater the elastic modulus E of the material, the greater the rigidity K of the structure. The greater the thickness t of the structure, the greater the rigidity K of the structure. The less the area S of the structure, the greater the rigidity K of the structure. At this time, the above relationship may be simply described using Equation (2):

$$K \propto (E \cdot t)/S. \tag{2}$$

Therefore, increasing the elastic modulus E of the material, increasing the thickness t of the material, reducing the area S of the structure, or the like, or any combination thereof, may increase the rigidity K of the structure, which may further increase the resonance frequency of the structure.

In some embodiments, the ear hook housing 31 may be made of a soft material (e.g., a material having a small elastic modulus, such as polycarbonate, polyamide, etc., the elastic modulus may be within a range of 2 to 3 GPa). The core housing 21 may be made of a hard material (e.g., a material having a large elastic modulus, such as polycarbonate including 20% to 50% of glass fibers, etc., the elastic modulus of the material may be within a range of 6 to 8 GPa). In some embodiments, an elastic modulus of the material of the core housing 21 may be 3 to 6 GPA greater than an elastic modulus of the material of the ear hook housing 31. In some embodiments, the elastic modulus of the material of the core housing 21 may be 4 to 5 GPA greater than the elastic modulus of the material of the ear hook housing 31. In some embodiments, the elastic modulus of the material of the core housing 21 may be 5 GPa greater than the elastic modulus of the material of the ear hook housing 31. Due to the difference in the elastic modulus, the rigidity of the ear hook housing 31 and the rigidity of the core housing 21 may be inconsistent, which may easily result in sound leaking. Further, after the ear hook housing 31 is connected with the core housing 21, since the rigidity of the ear hook housing 31 is different with the rigidity of the core housing 21, the structure may easily generate resonance in a relatively low frequency. To this end, in some embodiments, when the elastic modulus of the core housing 21 is greater than the elastic modulus of the ear hook housing 31, the earphone fixing portion 311 may be disposed with a reinforcing structure 318 (referring to FIG. 10). In some embodiments, the reinforcing structure 318 may be configured to cause a ratio of the difference between the rigidity K1 of the skin contact region of the core housing 21 and the rigidity K2 of the earphone fixing portion 311 and the rigidity K1 of the skin contact region of the core housing 21 to be less than or equal to 10%. That is, $(K1-K2)/K1 \leq 10\%$, or $K2/K1 \geq 90\%$. Therefore, the core housing 21 may have a sufficiently large rigidity to cause the resonant frequency of the core housing 21 to be located at a region with a frequency as high as possible. The difference between the rigidity of the earphone fixing portion 311 and the rigidity of the core housing 21 may be reduced to increase the resonant frequency of the structure and reduce the sound leakage.

Figure 10:
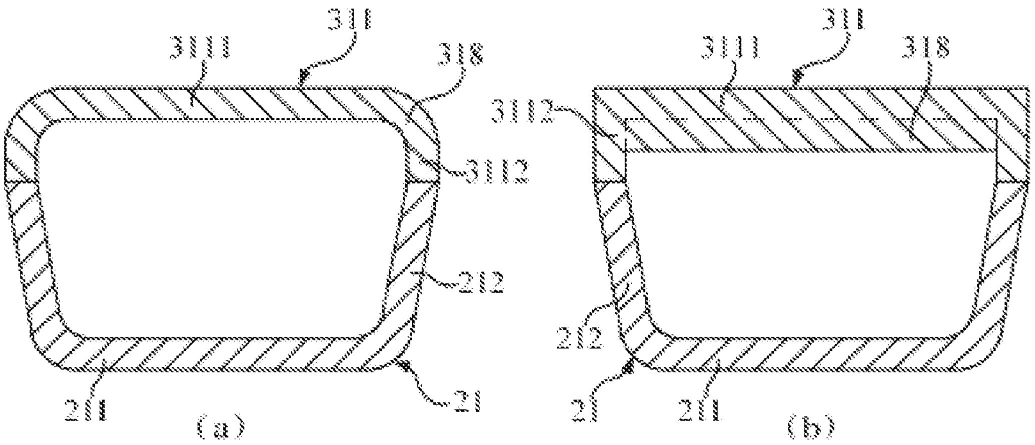
FIG. 10 is a schematic diagram illustrating a cross-sectional view of a core housing of an earphone according to some embodiments of the present disclosure.

FIG. 10 is a schematic diagram illustrating a cross-sectional view of a core housing of an earphone according to some embodiments of the present disclosure.

As shown in FIG. 10, in some embodiments, the core housing 21 may include the bottom wall 211 and the annular peripheral wall 212. In some embodiments, the bottom wall 211 may be the skin contact region of the core housing 21. One end of the annular peripheral wall 212 may be integrally connected with the bottom wall 211. In other words, the bottom wall 211 may be configured to be in contact with the user's skin. In some embodiments, the earphone fixing portion 311 may include a fixing body 3111 connected with the bending transition portion 312 and an annular flange 3112 integrally connected with the fixing body 3111 and extending toward the core housing 21. In some embodiments, the annular flange 3112 and the other end of the annular peripheral wall 212 away from the bottom wall 211 may be connected with each other. The annular flange 3112 and the other end of the annular peripheral wall 212 may be connected by a glue connection or a combination of the glue connection and a clamping connection.

Figure 11:
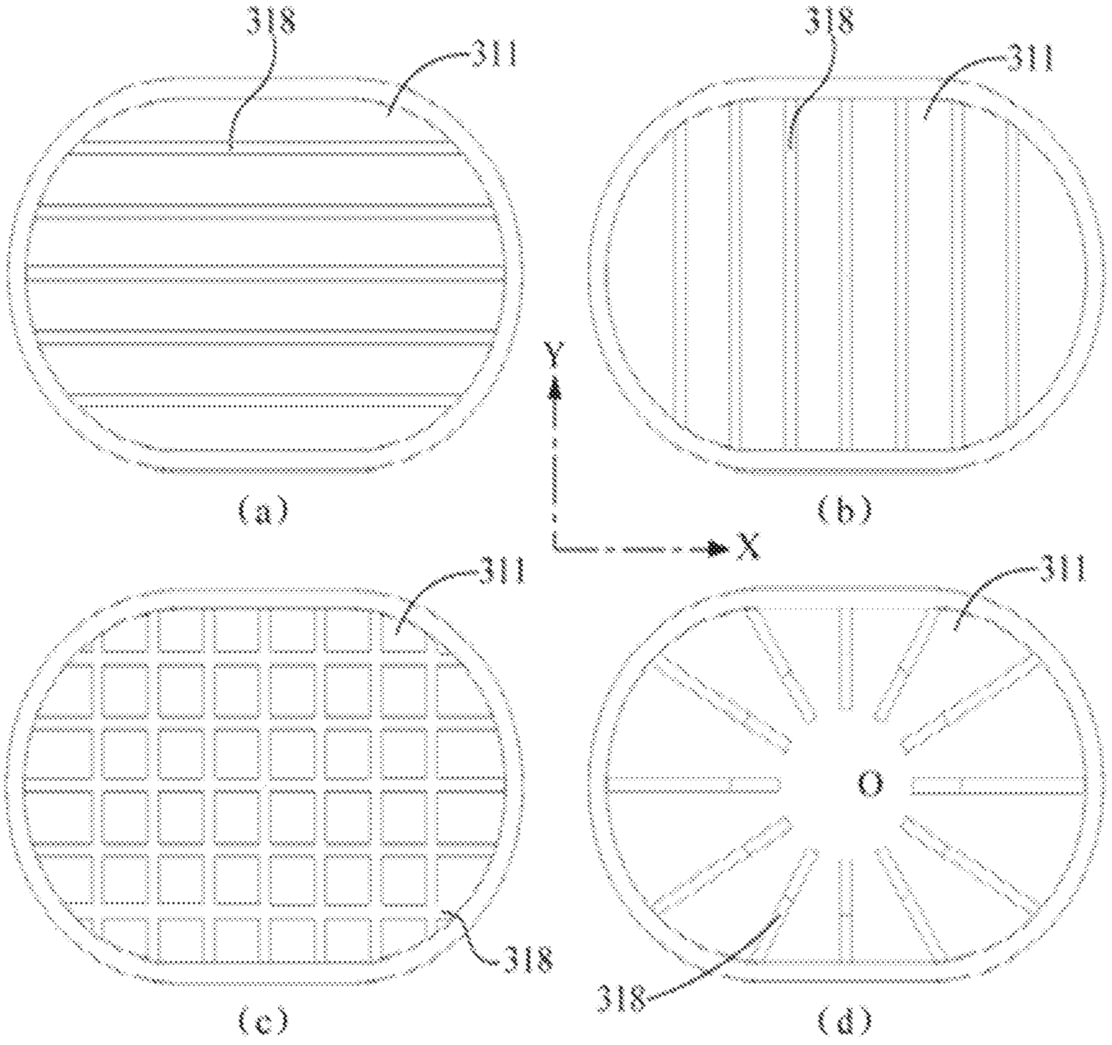
FIG. 11 is a schematic diagram illustrating a top view of a reinforcing structure of an earphone according to some embodiments of the present disclosure.

It should be noted that, in some embodiments of the present disclosure, a shape of the bottom wall 211 may include a triangle, a trapezoid, a rectangle, a square, a circle, an ellipse, an oval-like shape (similar to the shape of the earphone fixing portion 311 shown in FIG. 11), or the like, or any combination thereof. In some embodiments, the annular peripheral wall 212 may be perpendicular to the bottom wall 211. That is, an area of the opening end of the core housing 21 may be equal to an area of the bottom wall 211. The annular peripheral wall 212 may be inclined outward relative to the bottom wall 211 (e.g., an inclination angle is less than or equal to 30 degrees). That is, the area of the opening end of the core housing 21 may be greater than the area of the bottom wall 211. Merely by way of example, the bottom wall 211 may be an oval-like shape, and the annular peripheral wall 212 may be inclined 10 degrees outward relative to the bottom wall 211. Therefore, under the premise of ensuring a certain wearing comfort (because the bottom wall 211 as the skin contact region of the core housing 21 is in contact with the user's skin, the region may not too small), the area of the bottom wall 211 may be reduced. The resonance frequency of the core housing 21 may be increased.

As shown in (a) of FIG. 10, in some embodiments, the reinforcing structure 318 may include an arcuate structure disposed between the fixing body 3111 and the annular flange 3112. That is, the reinforcing structure 318 may be performed by a fillet process to abut the fixing body 3111 and the annular flange 3112. In some embodiments, since a size of the annular flange 3112 in a thickness direction of the earphone fixing portion 311 is small, the annular flange 3112 may be integrated with the above arcuate structure. At this time, for the earphone fixing portion 311, the structure of the earphone fixing portion 311 may include the fixing body 3111 and the reinforcing structure 318 with the arcuate structure. Therefore, the above arcuate structure may be configured to reduce the valid area of the earphone fixing portion 311 and increase the rigidity of the earphone fixing portion 311, thereby reducing the difference between the rigidity of the earphone fixing portion 311 and the rigidity of the core housing 21. It should be noted that the size of the arcuate structure may be reasonably designed according to rigidity requirements of the earphone fixing portion 311.

As shown in (b) of FIG. 10, the reinforcing structure 318 may be a thickened layer integrally disposed with the fixing body 3111. That is, the reinforcing structure 318 may be performed by a thickening process to thicken the fixing body 3111. A material of the thickened layer may be the same as the material of the ear hook housing 31. For example, the material of the thickened layer may further include polycarbonate, polyamide, an acrylonitrile-butadiene-styrene copolymer, or the like, or any combination thereof. It should be noted that the reinforcing structure 318 may be located on one side of the fixing body 3111 close to the core housing 21. Alternatively, the reinforcing structure 318 may be located on the other side of the core housing 21 facing away from the fixing body 3111. In some embodiments, the reinforcing structure 318 may also be located on both sides of the fixing body 3111. In some embodiments, since the size of the annular flange 3112 in the thickness direction of the earphone fixing portion 311 is small, the annular flange 3112 may be integrated with the above thickened structure. At this time, the earphone fixing portion 311 may include the fixing main body 3111 and the reinforcing structure 318 disposed with the thickened layer. Therefore, the above thickened structure may be configured to reduce the valid area of the earphone fixing portion 311 and increase the rigidity of the earphone fixing portion 311, thereby reducing the difference between the rigidity of the earphone fixing portion 311 and the rigidity of the core housing 21. It should be noted that the size of the thickened layer may be reasonably designed according to the rigidity requirements of the earphone fixing portion 311.

In some embodiments, the reinforcing structure 318 may include a metal piece. In some embodiments, the material of the metal member may include aluminum alloys, magnesium alloys, titanium alloys, nickel alloys, chromium molybdenum steel, stainless steel, or the like, or any combination thereof. At this time, the reinforcing structure 318 and the earphone fixing portion 311 may be a structure piece formed by metal insert injection molding. Therefore, the metal member may effectively increase the rigidity of the earphone fixing portion 311, thereby reducing the difference between the rigidity of the earphone fixing portion 311 and the core housing 21. It should be noted that parameters (e.g., a material, a size, etc.) of the metal member may be reasonably designed according to the rigidity requirements of the earphone fixing portion 311.

FIG. 11 is a schematic diagram illustrating a top view of a reinforcing structure of an earphone according to some embodiments of the present disclosure.

As shown in FIG. 11, in some embodiments, the reinforcing structure 318 may include a reinforcing rib disposed on the earphone fixing portion 311. The reinforcing rib may be distributed on one side of the earphone fixing portion 311 close to the core housing 21. In some embodiments, the reinforcing structure 318 may include a plurality of reinforcing ribs. The plurality of reinforcing ribs may be disposed in parallel as shown in (a) and (b) of FIG. 11 or disposed to form a grid patter as shown in (c) of FIG. 11. In some embodiments, the plurality of reinforcing ribs may also be disposed in a radial shape as shown in (d) of FIG. 11 with a preset reference point on the earphone fixing portion 311 as a center. In some embodiments, a material of the reinforcing rib may be the same as the material of the ear hook housing 31. For example, the material of the reinforcing rib may include polycarbonate, polyamide, an acrylonitrile-butadiene-styrene copolymer, or the like, or any combination thereof. Therefore, compared with injection molding of metal members on the earphone fixing part 311 or directly thickening the earphone fixing part 311, the reinforcing ribs disposed on the earphone fixing portion 311 may increase the rigidity of the earphone fixing portion 311 and balance the weight of the earphone fixing portion 311.

As shown in FIG. 11, the earphone fixing portion 311 may include a long axis direction (e.g., a direction indicated by a dotted line X in FIG. 11) and a short axis direction (e.g., a direction indicated by a dotted line Y in FIG. 11). In some embodiments, a size of the earphone fixing portion 311 along the long axis direction may be greater than a size of the earphone fixing portion 311 along the short axis direction. The following is an exemplary description of the distribution of the reinforcing ribs.

As shown in (a) of FIG. 11, a plurality of reinforcing ribs may be strip-shaped and extend along the long axis direction to be disposed side by side along the short axis direction. At this time, the reinforcing structure 318 may be simplified as adding reinforcing ribs on a long-side of the earphone fixing portion 311.

As shown in (b) of FIG. 11, a plurality of reinforcing ribs may be strip-shaped and extend along the short axis direction to be disposed side by side along the long axis direction. At this time, the reinforcing structure 318 may be simplified as adding reinforcing ribs on a short-side of the earphone fixing portion 311.

As shown in (c) of FIG. 11, a plurality of reinforcing ribs may be disposed along the long axis direction and the short axis direction, respectively, to form a grid pattern. At this time, the reinforcing structure 318 may be simplified as adding reinforcing ribs on a cross of the earphone fixing portion 311.

As shown in (d) of FIG. 11, ends of a plurality of reinforcement ribs close to each other may be disposed at intervals. Extension lines of the plurality of reinforcement ribs may intersect at the preset reference point (as shown by a solid point O in FIG. 11). At this time, the reinforcing structure 318 may be simplified as adding reinforcing ribs on a radiational direction of the earphone fixing portion 311.

In some embodiments, when the following size relationship is satisfied by the reinforcing rib and the earphone fixing portion 311, the rigidity of the earphone fixing portion 311 may be effectively increased, and the weight of the earphone fixing portion 311 may be balanced. For example, a ratio between a thickness of the reinforcing rib and a thickness of the earphone fixing portion 311 may be within a range of 0.8 to 1.2. A ratio between a width of the reinforcing rib and the thickness of the earphone fixing portion 311 may be within a range of 0.4 to 0.6. A ratio between an interval between two reinforcing ribs (e.g., two adjacent reinforcing ribs) and the thickness of the earphone fixing portion 311 may be within a range of 1.6 to 2.4. In some embodiments, the thickness of the reinforcing rib may be the same as the thickness of the earphone fixing portion 311, and the interval between two reinforcing ribs may be twice the thickness of the earphone fixing portion 311. Merely by way of example, the thickness of the earphone fixing portion 311 may be 0.8 millimeters, and the thickness, width of the reinforcing rib, and the interval between two adjacent reinforcing ribs may be 0.8 millimeters, 0.4 millimeters, and 1.6 millimeters, respectively.

It should be noted that the various reinforcing structures shown in FIGS. 10 and 11 may be reasonably assembled based on the rigidity requirements of the earphone fixing portion 311, which may not be limited herein.

Figure 12:
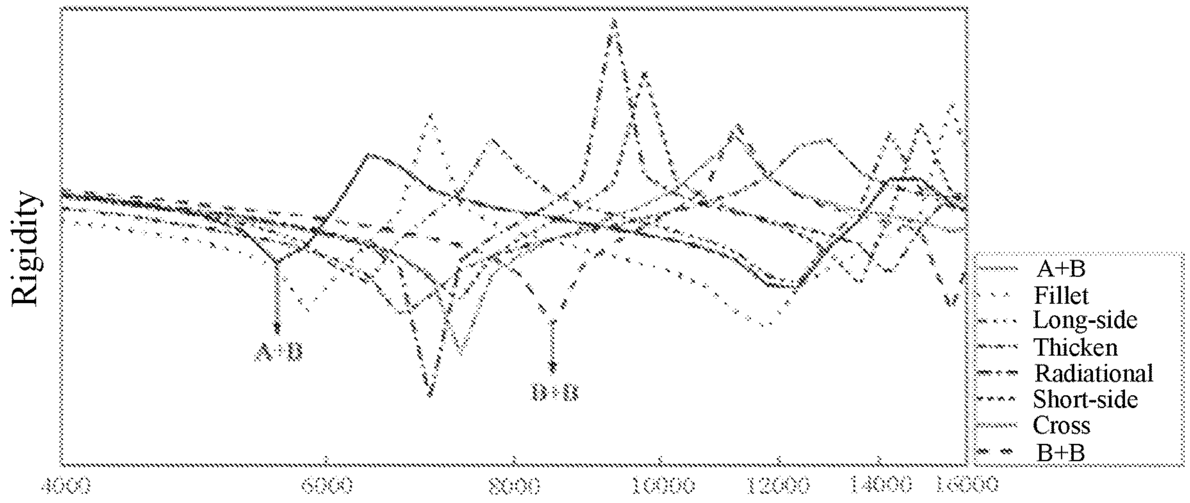
FIG. 12 is a schematic diagram illustrating frequency response curves corresponding to a plurality of reinforcing structures according to some embodiments of the present disclosure.

FIG. 12 is a schematic diagram illustrating frequency response curves corresponding to a plurality of reinforcing structures according to some embodiments of the present disclosure.

As shown in FIG. 12, the curve (A+B) may indicate that the material of the earphone fixing portion 311 is different from the material of the core housing 21 (e.g., the elastic modulus of the earphone fixing portion 311 is less than the elastic modulus of the core housing 21), and there is no improvement of the structure of the earphones fixing portion 311. The curve (B+B) may indicate that the material of the earphone fixing portion 311 is the same as the material of the core housing 21 (e.g., the elastic modulus of the earphone fixing portion 311 is the same as the elastic modulus of the core housing 21), and the structure of the earphone fixing portion 311 is similar to the structure of the core housing 21 (e.g., the thickness of the earphone fixing portion 311 equals the thickness of the core housing 21, and the area of the earphone fixing portion 311 equals the area of the bottom wall 211). A may correspond to the earphone fixing portions 311. B may correspond to the bottom wall 211 (e.g., the skin contact region of the core housing 21). (A+B) and (B+B) may correspond to the ear hook housing 31 (e.g., the earphone fixing portion 311) disposed on the core housing 21.

As shown in FIG. 12, for the structural (A+B), a resonant valley (corresponding to the first high frequency valley V) of the structural (A+B) appears at a frequency of about 5500 Hz. For the structural (B+B), a resonant valley (corresponding to the first high frequency valley V) of the structural (B+B) appears at a frequency of about 8400 Hz. If the structure (A+B) is improved to the structure (B+B), the resonant frequency of the structure may be effectively increased.

In some embodiments, for the structural (A+B), after the earphone fixing portion 311 is disposed with a fillet as shown in (a) of FIG. 10, a thicken as shown in (b) of FIG. 10, a long-side as shown in (a) of FIG. 11, a short-side as shown in (b) of FIG. 11, a cross as shown in (c) of FIG. 11, and a radiational shape as shown in (d) of FIG. 11, the resonance valley of (A+B+the reinforcement structure) may appear in a frequency range of 5500 to 8400 Hz. In other words, the reinforcing structure 318 disposed on the earphone fixing portion 311 may increase the resonance frequency of the structure. That is, the reinforcing structure 318 may reduce the difference between the rigidity of the earphone fixing portion 311 and the rigidity of the core housing 21, thereby reducing the above sound leakage. It should be noted that if the structures of the reinforcing structure 318 are different, the increases of the resonant frequency may be different.

Based on the above detailed description, when the earphone 10 is the bone conduction earphone, the core 22 may generate the vibrations under the excitation of the electrical signals. The core housing 21 may be vibrated with the vibrations. When the user wears the earphone 10, the bottom wall 211 of the core housing 21 (e.g., the skin contact region) may be in contact with the user's skin, so that the above vibrations may be transmitted to the cochlear nerve through the human skull, which may cause the user to hear the sound played by the earphone 10. At this time, in order to ensure the reliability of the transmission of the vibrations, the core housing 21 may at least be vibrated with the core 22. Therefore, the core 22 may be fixed in the core housing 21.

Figure 13:
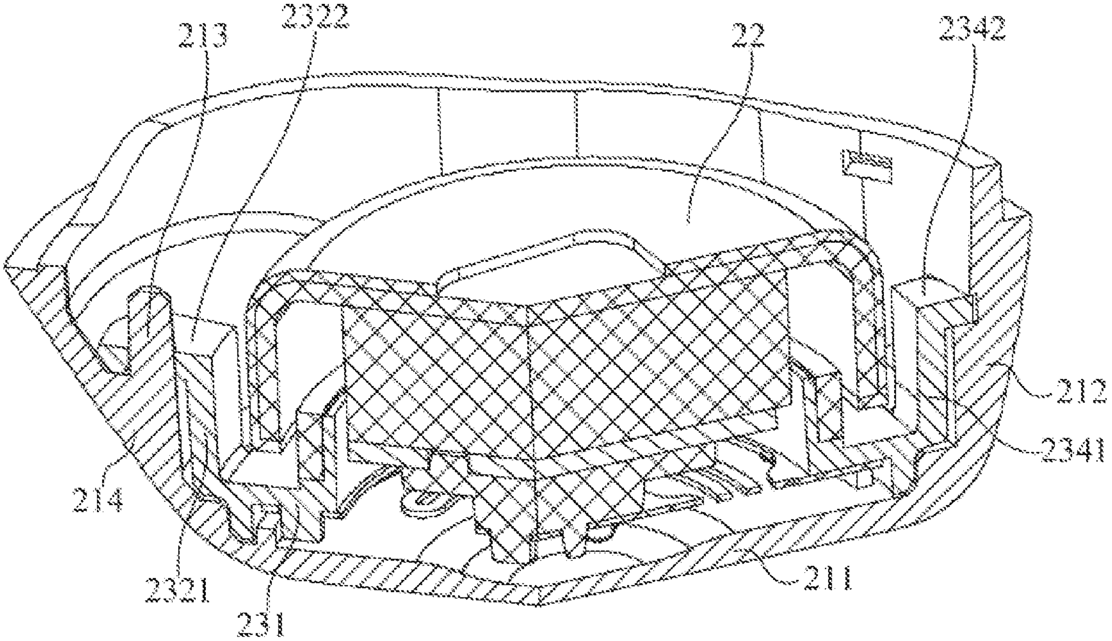
FIG. 13 is a schematic diagram illustrating a cross-sectional structure of a core module of an earphone according to some embodiments of the present disclosure.

FIG. 13 is a schematic diagram illustrating a cross-sectional structure of a core module of an earphone according to some embodiments of the present disclosure.

As shown in FIG. 13 and FIG. 8, in some embodiments, one end of the core housing 21 may include an opening. The core bracket 23 and the core 22 may be accommodated in the core housing 21. The core bracket 23 may be configured to fix the core 22 in the core housing 21.

Figure 14:
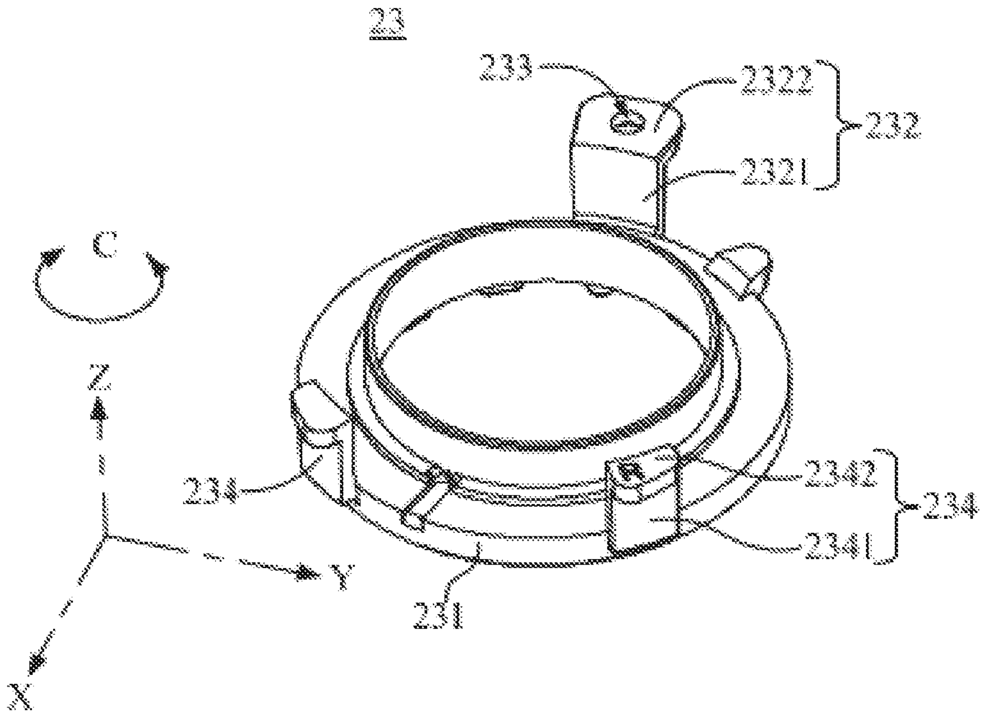
FIG. 14 is a schematic diagram illustrating a structure of a core bracket of an earphone according to some embodiments of the present disclosure.

FIG. 14 is a schematic diagram illustrating a structure of a core bracket of an earphone according to some embodiments of the present disclosure.

Referring to FIG. 14, in some embodiments, the core bracket 23 may include an annular bracket body 231 and a limiting structure disposed on the bracket body 231. The core 22 may be hung on the bracket body 231 to be fixedly connected with the core housing 21. Referring to FIGS. 13 and 14, the limiting structure and the core housing 21 may be in an interference fit, so that the core bracket 23 may be relatively fixed with the core housing 21 along a circumferential direction (e.g., the direction denoted by arrow C as shown in FIG. 14) of the bracket body 231. A plane where the bracket body 231 is located may be parallel to a plane of the bottom wall 211 to increase the fit between the bracket body 231 and the bottom wall 211, thereby increasing a transmission effect of the vibrations. At this time, a glue (not shown in FIG. 13), such as a structural glue, a hot melt glue, an instant glue, etc., may be disposed between the bracket body 231 and the bottom wall 211. Therefore, the core bracket 23 and the core housing 21 may be assembled by the glue connection and the clamping connection, which may effectively restrict a degree of freedom between the core bracket 23 and the core housing 21. In some embodiments, the core bracket 23 and the core housing 21 may be fixed directly through the glue connection. For example, a glue (not shown in FIG. 13), such as a structural glue, a hot melt glue, an instant glue, etc., may be disposed between the bracket body 231 and the bottom wall 211, which may effectively restrict the degree of freedom between the core bracket 23 and the core housing 21. The structure of the core housing 21 may also be simplified.

As shown in FIG. 13, the core housing 21 may further include a positioning pillar 213 connected with the bottom wall 211 or the annular peripheral wall 212. As shown in FIG. 14, the limiting structure may include a first limiting structure 232. In some embodiments, the first limiting structure 232 may be disposed with an insertion hole 233. In some embodiments, the positioning post 213 may be inserted in the insertion hole 233. Therefore, the accuracy of assembly between the core bracket 23 and the core housing 21 may be effectively increased. Further, the above glue may be disposed between the bracket body 231 and the bottom wall 211.

As shown in FIG. 14, in some embodiments, the limiting structure may further include a second limiting structure 234. The second limiting structure 234 may be spaced apart from the first limiting structure 232 along the circumferential direction of the bracket body 231 (e.g., the direction denoted by arrow C as shown in FIG. 14). The second limiting structure 234 may be abutted with the annular peripheral wall 212, which may be described in detail later. Therefore, the second limiting structure 234 and the first limiting structure 232 may be fitted to the corresponding structures on the core housing 21, respectively, so that the core bracket 23 may be relatively fixed with the core housing 21. That is, the degree of freedom between the core bracket 23 and the core housing 21 may be effectively limited.

In some embodiments, the opening end of the annular peripheral wall 212 may include a long axis direction (e.g., a direction indicated by a dotted line X in FIG. 8) and a short axis direction (e.g., a direction indicated by a dotted line Y in FIG. 8). A size of the opening end of the annular peripheral wall 212 in the long axis direction may be greater than the size of the opening end of the annular peripheral wall 212 in the short axis direction.

Figure 15:
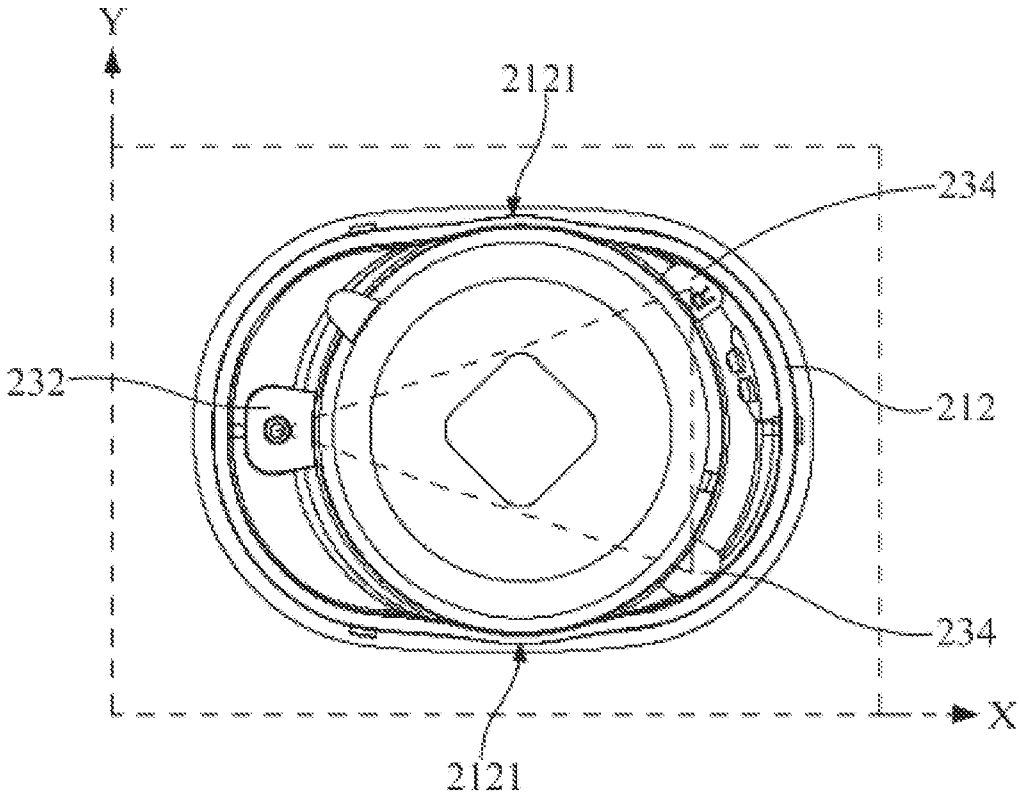
FIG. 15 is a schematic diagram illustrating a top view of a structure of a core module of an earphone according to some embodiments of the present disclosure.

FIG. 15 is a schematic diagram illustrating a top view of a structure of a core module of an earphone according to some embodiments of the present disclosure.

Referring to FIGS. 14 and 15, in some embodiments, the first limiting structure 232 and the second limiting structure 234 may be disposed on opposite sides of the bracket body 231 at intervals along the long axis direction. Projections of the first limiting structure 232 and the second limiting structure 234 on a reference plane where the opening end of the annular peripheral wall 212 is located (e.g., the plane indicated by the dashed rectangular frame in FIG. 15) may be at least partially located outside a projection of the bracket body 231 on the reference plane. Therefore, the first limiting structure 232 may cooperate with the positioning pillar 213. The second limiting structure 234 may cooperate with the annular peripheral wall 212.

As shown in FIG. 14, the first limiting structure 232 may include a first axial extension portion 2321 and a first radial extension portion 2322. The first axial extension portion 2321 may be connected with the bracket body 231 and extend toward a side where the core 22 is located along an axial direction of the bracket body 231 (e.g., a direction indicated by a dotted line Z in FIG. 14). The first radial extension portion 2322 may be connected with the first axial extension portion 2321 and extend toward an outer side of the bracket body 231 along a radial direction of the bracket body 231 (e.g., a direction of a diameter of the bracket body 231). In some embodiments, the insertion hole 233 may be disposed on the first radial extension portion 2322, so that the first limiting structure 232 may cooperate with the positioning pillar 213.

As shown in FIG. 14, in some embodiments, the second limiting structure 234 may include a second axial extension portion 2341 and a second radial extension portion 2342. The second axial extension portion 2341 may be connected with the bracket body 231 and extend toward a side where the core 22 is located along an axial direction of the bracket body 231. The second radial extension portion 2342 may be connected with the second axial extension portion 2341 and extend toward the outer side of the bracket body 231 along a radial direction of the bracket body 231. In some embodiments, the second radial extension portion 2342 may be abutted with the annular peripheral wall 212. For example, the second radial extension portion 2342 may be abutted with the annular peripheral wall 212 by a clamping connection, so that the second limiting structure 234 may be abutted with the annular peripheral wall 212. In some embodiments, the core 22 may be located between the first axial extension portion 2321 and the second axial extension portion 2341.

It should be noted that, as shown in FIGS. 13 to 15, taking the core 22 as a reference, if a region between the first axial extension portion 2321 and the second axial extension portion 2341 is an inner side of the bracket body 231, a region other than the inner side may be the outer side of the bracket body 231.

Referring to FIG. 13, the annular peripheral wall 212 may further include an inclined region 214 that corresponds to the first restriction 232 and is inclined relative to the bottom wall 211. The positioning pillar 213 may be disposed on the inclined region 214. Therefore, a height of the positioning pillar 213 may be reduced compared to disposing the positioning pillar 213 on the bottom wall 211. Therefore, a structural strength of the positioning pillar 213 (e.g., a root portion of the positioning pillar 213 connected with the inclined region 214) on the core housing 21 may be increased, which may avoid breaking or falling off of the positioning pillar 213 when the earphone 10 falls or collides.

Referring to FIG. 15, a count of the second limiting structures 234 may be two. The two second limiting structures 234 may be disposed at intervals along the short axis direction. The projection of the first limiting structure 232 on the reference plane and the projections of the two second limiting structures 234 on the reference plane may be connected sequentially to form an acute triangle (e.g., the dotted triangle as shown in FIG. 15). At this time, the acute triangle may include an acute isosceles triangle, an equilateral triangle, etc. Therefore, interaction points between the core bracket 23 and the core housing 21 may be disposed as symmetrically as possible, thereby increasing the reliability of the assembly of the core bracket 23 and the core housing 21.

In some embodiments, an outer profile of the bracket body 231 may be disposed in a circular shape. The annular peripheral wall 212 may be disposed with two arcuate recesses 2121 opposite to each other along the short axis direction. The outer profile of the bracket body 231 may be embedded in two arcuate recesses 2121, respectively. Therefore, the degree of freedom between the core bracket 23 and the core housing 21 may be further limited.

Based on the above detailed description, when the elastic modulus of the core housing 21 is greater than the elastic modulus of the ear hook housing 31, the ear hook housing 31 may be connected with the core housing 21 to form the above structure (A+B). Due to the difference in the rigidity, the resonant frequency of the structure (A+B) may be lower (the curve (A+B) as shown in FIG. 12). The sound leakage may be easily generated. After the structure (A+B) is improved to the structure (B+B), the resonance frequency of the structure (the curve (A+B) as shown in FIG. 12) may be effectively increased. Based on the improvement, the correlation structure of the core module 20 may be improved according to some embodiments of the present disclosure.

Figure 16:
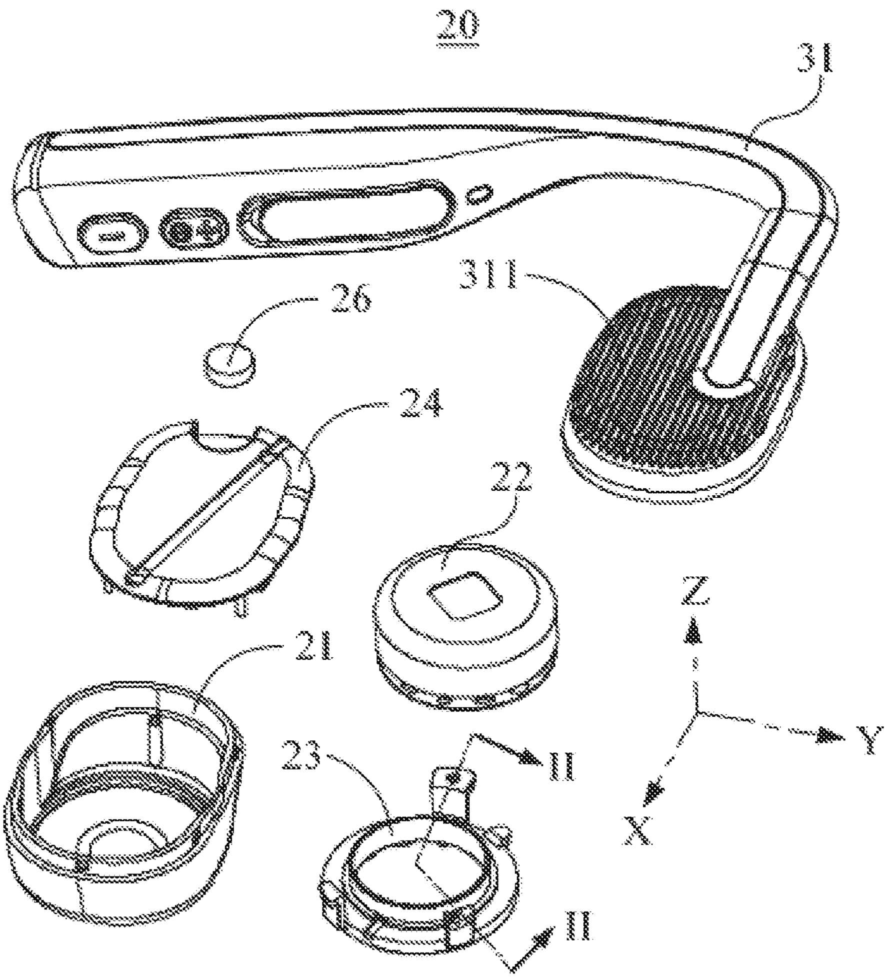
FIG. 16 is a schematic diagram illustrating a breakdown structure of an earphone according to some embodiments of the present disclosure.

FIG. 16 is a schematic diagram illustrating a breakdown structure of an earphone according to some embodiments of the present disclosure.

As shown in FIG. 16, the core module 20 may further include a cover plate 24. In some embodiments, one end of the core housing 21 may include an opening. The cover plate 24 may be disposed on the opening end of the core housing 21 (e.g., the end of the core housing 21 with the opening) to form a chamber structure for accommodating the core 22. In other words, the cover plate 24 may be covered on the other end of the annular peripheral wall 212 away from the bottom wall 211 and disposed opposite to the bottom wall 211. At this time, the cover plate 24 and the core housing 21 may be connected by a glue connection or a combination of a clamping connection and the glue connection. In some embodiments, the ear hook housing 31 may be connected with the cover plate 24. For example, the earphone fixing portion 311 may cover one side of the cover plate 24 facing away from the core housing 21 in a full cover or semi-covered manner. In some embodiments, the full cover of the cover plate 24 by the earphone fixing portion 311 may be taken as an example for an exemplary description. At this time, the ear hook housing 31 and the core housing 21 may be connected by the glue connection or the combination of the clamping connection and the glue connection.

It should be noted that the ear hook housing in FIG. 16 is mainly for the convenience of describing the relative position relationship between the ear hook housing and the cover plate, which may further implicitly indicate a possible assembly manner between the ear hook housing and the cover plate.

In some embodiments, the elastic modulus of the core housing 21 may be greater than the elastic modulus of the ear hook housing 31. The elastic modulus of the cover plate 24 may be greater than the elastic modulus of the ear hook housing 31. At this time, the cover plate 24 may be connected with the core housing 21, which may increase a rigidity of the structure of the opening end of the core housing 21 (e.g., the cover plate 24 and the earphone fixing portion 311). Therefore, the difference between the rigidity of the bottom wall 211 of the core housing 21 and the rigidity of the structure of the opening end of the core housing 21 may be further reduced. The core housing 21 may have a sufficiently large rigidity to cause the resonant frequency of the core housing 21 to be located at a region with a frequency as high as possible. The resonant frequency of the structure (the core housing 21, the cover plate 24, and the earphone fixing portion 311) may be increased, thereby reducing the sound leakage.

In some embodiments, the elastic modulus of the cover plate 24 may be less than or equal to the elastic modulus of the core housing 21. For example, the elastic modulus of the cover plate 24 may equal to the elastic modulus of the core housing 21. At this time, the cover plate 24 may be connected with the core housing 21 to form the structure (B+B). Therefore, a ratio of a difference between the rigidity K1 of the bottom wall 211 and a rigidity K3 of the cover plate 24 and the rigidity K1 of the bottom wall 211 may be less than or equal to 10%. That is, $(K1-K3)/K1 \leq 10\%$, or $K3/K1 \geq 90\%$.

In some embodiments, the area of the bottom wall 211 may be less than or equal to the area of the cover plate 24. The thickness of the bottom wall 211 may be less than or equal to the thickness of the cover plate 24. Based on the above detailed description, under the premise of ensuring a certain wearing comfort, the area of the bottom wall 211 may be reduced. The resonance frequency of the core housing 21 may be increased. Therefore, in some embodiments, in order to ensure that the core housing includes a sufficiently large rigidity to enable a resonant frequency of the core housing to be located in a high frequency region with a frequency as high as possible, the area of the bottom wall 211 may be less than or equal to the area of the cover plate 24. That is, the area of the opening end of the core housing 21 may be greater than the area of the bottom wall 211. In some embodiments, according to the above Equation (2), when the elastic modulus of the cover plate 24 is less than or equal to the elastic modulus of the core housing 21, and the area of the bottom wall 211 is less than or equal to the area of the cover plate 24, in order to satisfy the above relationship equation (K1−K3)/K1≤10%, the thickness of the bottom wall 211 may be less than or equal to the thickness of the cover plate 24.

In some embodiments, a material of the cover plate 24 may be the same as the material of the core housing 21. For example, the material of the cover plate 24 and the core housing 21 may be a mixture of polycarbonate and glass fibers and/or carbon fibers. In some embodiments, according to Equation (2), in order to satisfy the above relationship equation K3/K1≥90%, a ratio of a ratio the thickness and the area of the cover plate 24 and a ratio the thickness and the area of the bottom wall 211 may be greater than or equal to 90%. For example, the ratio the thickness and the area of the cover plate 24 may be equal to the ratio the thickness and the area of the bottom wall 211.

It should be noted that, according to Equation (2), in order to satisfy the above relationship equation (K1−K3)/K1≤10%, structural parameters (e.g., the thickness, the area, and the ratio thereof) of the cover plate 24 and the core housing 21 may be determined based on the material of the cover plate 24 and the core housing 21. Alternatively, the material of the cover plate 24 and the core housing 21 may be determined based on the structural parameters (e.g., the thickness, the area, and the ratio) of the cover plate 24 and the core housing 21. Therefore, the above embodiments may include two possible designs.

Based on the above detailed description, after the cover plate 24 is connected with the core housing 21 instead of the earphone fixing portion 311, the earphone fixing portion 311 may still be connected to one side of the core housing 21 facing away from the cover plate 24. For example, the cover plate 24 may be fully covered by the earphone fixing portion 311.

In some embodiments, if the ear hook housing 31 and the cover plate 24 are plastic members, and the elastic modulus of the ear hook housing 31 is less than the elastic modulus of the cover plate 24, the ear hook housing 31 and the cover plate 24 may be formed an integrally structural piece by two-color injection molding. If the ear hook housing 31 is a plastic member, the cover plate 24 is a metal piece, and the elastic modulus of the ear hook housing 31 is less than the elastic modulus of the cover plate 24, the ear hook housing 31 and the cover plate 24 may be formed an integrally structural piece by metal insert injection molding. At this time, the ear hook housing 31 and the cover plate 24 may be connected with the core housing 21 as a whole. Therefore, a consistency of the ear hook housing 31 and the cover plate 24 in the vibration may be ensured.

In some embodiments, the earphone fixing portion 311 and the cover plate 24 may be connected by a glue connection or a combination of a clamping connection and the glue connection. At this time, the buttons mentioned above, the second microphone mentioned later, etc., may be disposed between the ear hook housing 31 and the cover plate 24. More descriptions regarding the structure may be found later. In some embodiments, a filling degree of the glue (not shown in FIG. 16) between the earphone fixing portion 311 and the cover plate 24 may be as large as possible. For example, the filling degree may be greater than or equal to 90%. When the filling degree of the glue between the earphone fixing portion 311 and the cover plate 24 is small, a connection strength between the earphone fixing portion 311 and the cover plate 24 may be small. A large hysteresis of the vibration may be between the earphone fixing portion 311 and the cover plate 24. In addition, air may be between the earphone fixing portion 311 and the cover plate 24, resulting in an adverse effect on the resonance frequency of the structure. Noise may also be generated during the vibrations of the structure.

Figure 17:
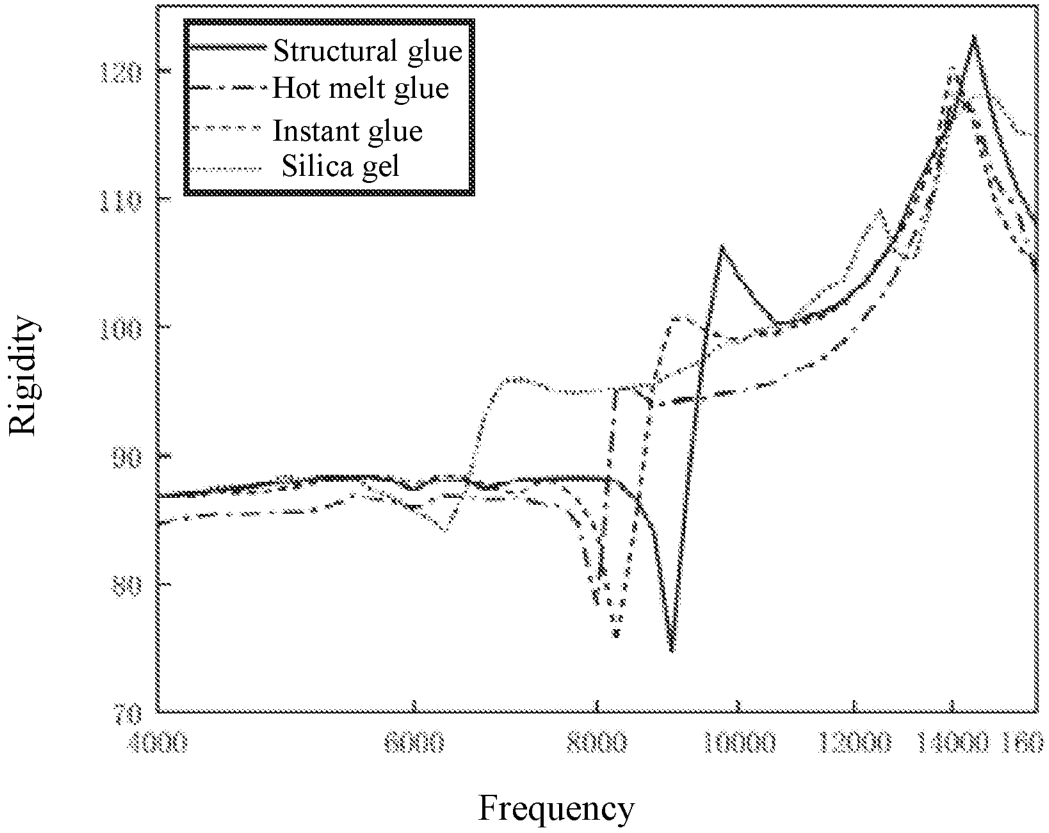
FIG. 17 is a schematic diagram illustrating modules of a signal processing system according to some embodiments of the present disclosure.

In some embodiments, a type of the glue (e.g., the structural glue, the hot melt glue, the instant glue, the silica gel, etc.) disposed between the earphone fixing portion 311 and the cover plate 24 may have an impact on the resonant frequency of the structure. FIG. 17 is a schematic diagram illustrating modules of a signal processing system according to some embodiments of the present disclosure. As shown in FIG. 17, different types of glues may have an impact on the resonant frequency of the structure. In some embodiments, a glue with a high hardness (e.g., the structural glue, the hot melt glue, etc.) may be disposed between the earphone fixing portion 311 and the cover plate 24.

Based on the above detailed description, the core bracket 23 may be configured to fix the core 22 in the core housing 21 to increase the reliability of the vibrations of the core casing 21 driven by the core 22. The cover plate 24 may be configured to increase the rigidity of the structure of the opening end of the core housing 21 (e.g., the cover plate 24 and the earphone fixing portion 311) to reduce the difference between the rigidity of the bottom wall 211 of the core housing 21 and the rigidity of the structure of the opening end of the core housing 21. The cooperation between the core bracket 23 and the core housing 21 (e.g., in the Z direction) may be implemented by a glue connection between the bracket body 231 and the bottom wall 211 and/or a clamping connection between the limiting structure and the annular peripheral wall 212.

In some embodiments, another cooperation between the core bracket 23 and the core housing 21 (e.g., in the Z direction) may be provided based on the cover plate 24.

Figure 18:
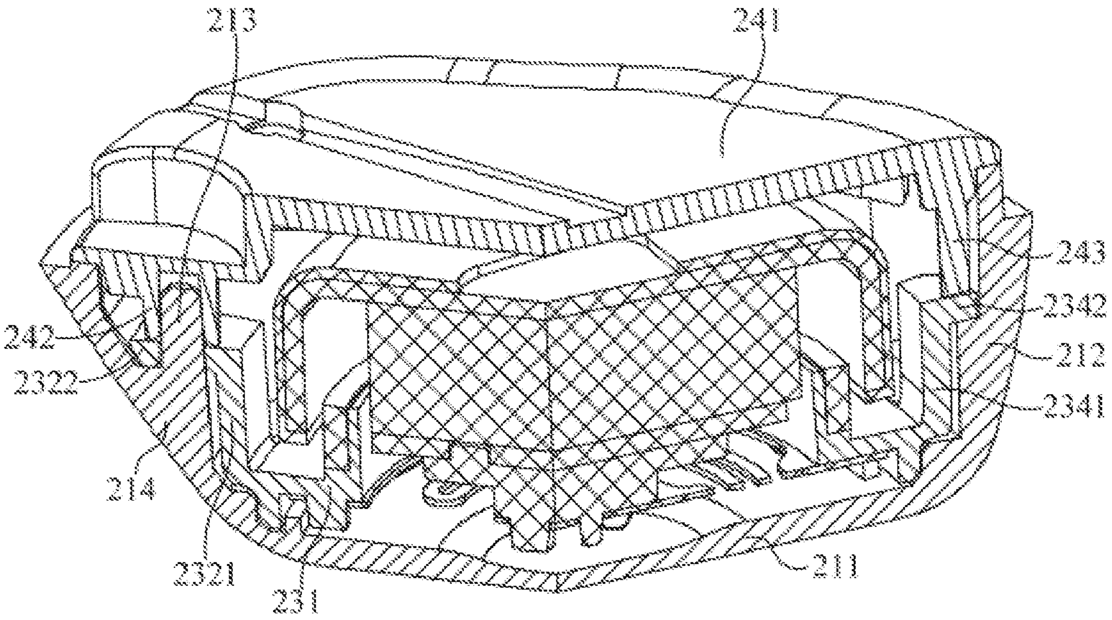
FIG. 18 is a schematic diagram illustrating a cross-sectional structure of a core module of an earphone according to some embodiments of the present disclosure.

FIG. 18 is a schematic diagram illustrating a cross-sectional structure of a core module of an earphone according to some embodiments of the present disclosure.

Figure 19:
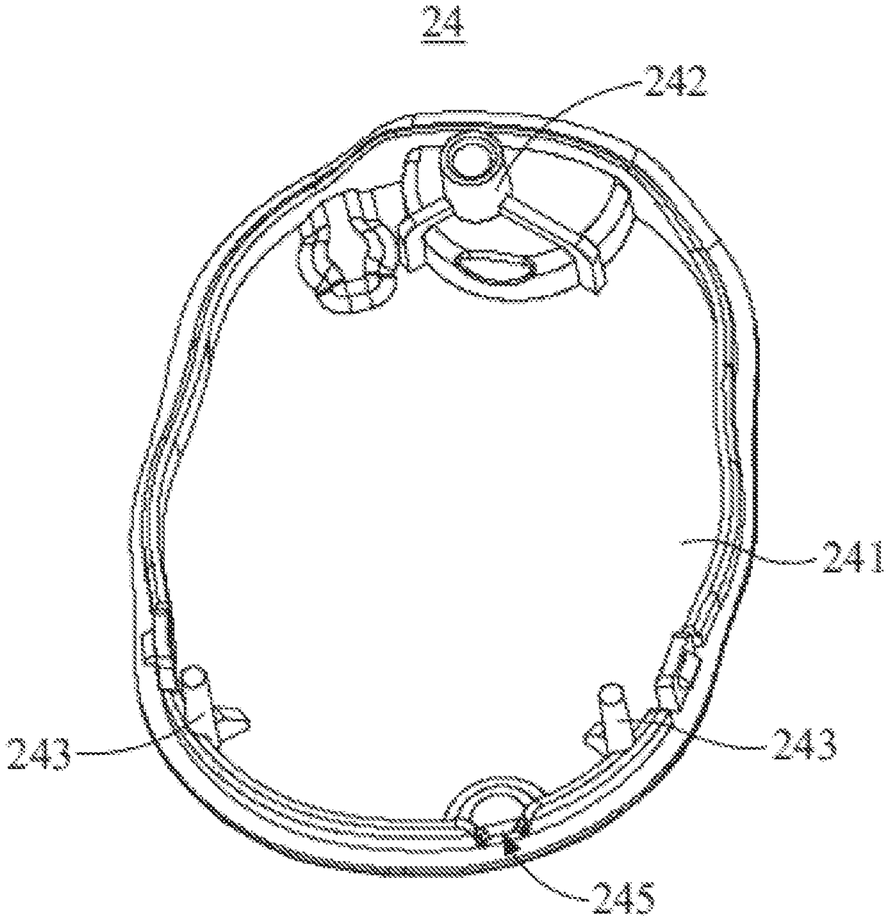
FIG. 19 is a schematic diagram illustrating a structure of a cover plate of an earphone according to some embodiments of the present disclosure.

FIG. 19 is a schematic diagram illustrating a structure of a cover plate of an earphone according to some embodiments of the present disclosure.

As shown in FIGS. 18 and 19, in some embodiments, the cover plate 24 may be covered on the opening end of the core housing 21. A press structure may be disposed on one side of the cover plate 24 toward the core housing 21. The press structure may be configured to press and fix the core bracket 23 in the core housing 21. Therefore, the cover plate 24 may increase the rigidity of the structure of the opening end of the core housing 21 (e.g., the cover plate 24 and the earphone fixing portion 311). In addition, the cover plate 24 may press the core bracket 23 in the core housing 21. Further, the cover plate 24 may achieve "one piece with two functions."

As shown in FIG. 19, the cover plate 24 may include a cover plate body 241 and a press surface integrally connected with the cover body 241. The press structure may include a first press pillar 242 and a second press pillar 243. The first press pillar 242 and the second press pillar 243 may be disposed at intervals along the circumferential direction of the cover body 241, and abutted with the core bracket 23. In some embodiments, a plane where the cover plate body 214 is located may be parallel to the plane where the bottom wall 211 is located, so that the plane where the cover plate body 214 is located may be parallel to the plane where the bracket body 231 is located, which may further cause extension directions of the first press pillar 242 and the second press pillar 243 may be perpendicular to the plane where the bracket body 231 is located. That is, the extension directions of the first press pillar 242 and the second press pillar 243 may be parallel to the Z direction. Therefore, the degree of freedom between the core bracket 23 and the core housing 21 (e.g., in the Z direction) may be effectively limited.

Figure 20:
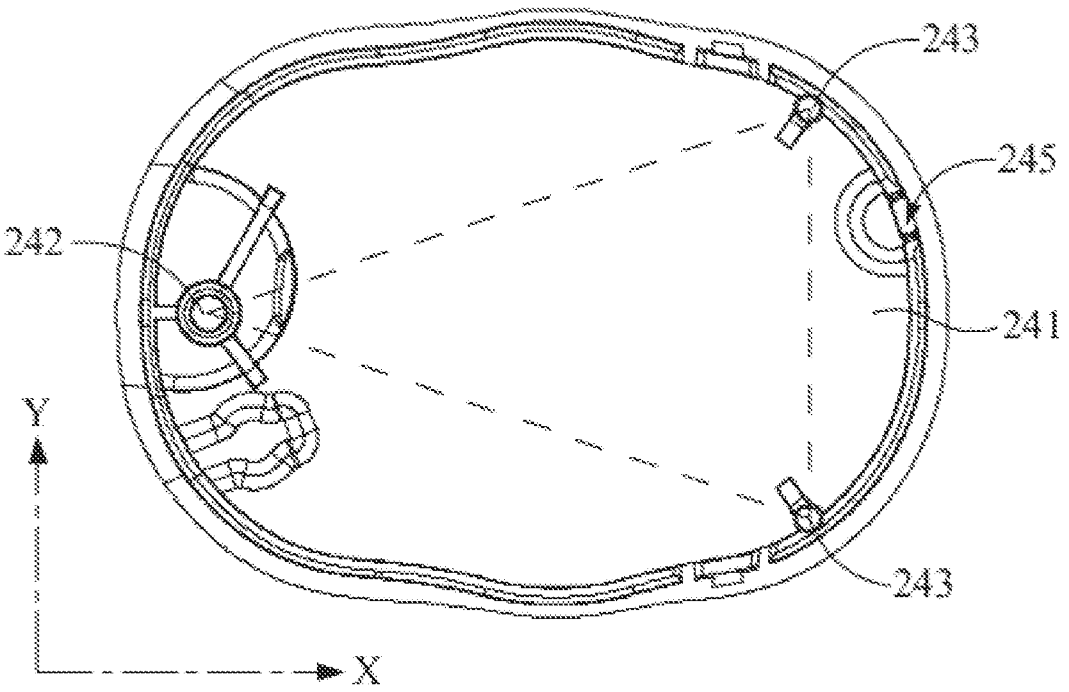
FIG. 20 is a schematic diagram illustrating a structure of a cover plate of an earphone according to some embodiments of the present disclosure.

FIG. 20 is a schematic diagram illustrating a structure of a cover plate of an earphone according to some embodiments of the present disclosure.

As shown in FIG. 20, the cover plate 24 may include a long axis direction (e.g., a direction indicated by a dotted line X in FIG. 20) and a short axis direction (e.g., a direction indicated by a dotted line Y in FIG. 20). A size of the cover plate 24 in the long axis direction may be greater than a size of the cover plate 24 in the short axis direction. At this time, the first press pillar 242 and the second press pillar 243 may be disposed at intervals along the long axis direction. Therefore, the reliability of pressing the core bracket 23 in the core housing 21 by the cover plate 24 may be increased.

In some embodiments, a count of the second press pillar 243 may be two. The two second press pillars 243 may be disposed at intervals along the short axis direction. A projection of the first press pillar 242 on the cover plate body 241 and projections of the two second press pillars 243 on the cover plate body 241 may be connected sequentially to form an acute triangle (e.g., the dotted triangle as shown in FIG. 20). At this time, the acute triangle may include an acute isosceles triangle, an equilateral triangle, etc. Therefore, interaction points between the core bracket 23 and the core housing 21 may be disposed as symmetrically as possible, thereby increasing the reliability of the assembly of the core bracket 23 and the core housing 21.

Referring to FIG. 18, the first press pillar 242 may be in contact with the first limiting structure 232 to form an abutment. The second press pillar 243 may be in contact with the second limiting structure 234 to form an abutment. At this time, the second limiting structure 232 and the annular peripheral wall 212 may not form the abutment shown in FIG. 13. The processing accuracy of the second limiting structure 232 may be reduced, which may further save a production cost of the core bracket 23.

Similarly, as shown in FIG. 14, the first limiting structure 232 may include the first axial extension portion 2321 and the first radial extension portion 2322. In some embodiments, the first axial extension portion 2321 may be connected with the bracket body 231 and extend toward the side where the core 22 is located along the axial direction (e.g., the direction indicated by the dotted line Z in FIG. 14) of the bracket body 231. The first radial extension portion 2322 may be connected with the first axial extension portion 2321 and extend toward the outer side of the bracket body 231 along the radial direction of the bracket body 231. At this time, the insertion hole 233 may be disposed on the first radial extension portion 2322. The first press pillar 242 may be abutted with the first radial extension portion 2322. That is, the first press pillar 242 may be pressed the first radial extension portion 2322. Further, as shown in FIG. 14, the second limiting structure 234 may include the second axial extension portion 2341 and the second radial extension portion 2342. The second axial extension portion 2341 may be connected with the bracket body 231 and extend toward the side where the core 22 is located along the axial direction of the bracket body 231. The second radial extension portion 2342 may be connected with the second axial extension portion 2341 and extend toward the outer side of the bracket body 231 along the radial direction of the bracket body 231. At this time, the second press pillar 243 may be abutted with the second radial extension portion 2342. That is, the second press pillar 243 may be abutted with the second radial extension portion 2342.

It should be noted that when the two second press pillars 243 may be disposed along the short axis direction, and the projection of the first press pillar 242 on the cover plate body 241 and the projections of the two second press pillars 243 on the cover plate body 241 are connected sequentially to form the acute triangle, two second limiting structures 234 may be disposed at intervals along the short axis direction, and disposed corresponding to the two second press pillars 243, respectively. Therefore, when the first press pillar 242 is abutted with the first limiting structure 232 (e.g., the first radial extension portion 2322), the two second press pillars 243 may be abutted with the second limiting structure 234 (e.g., the second radial extension portion 2342), thereby increasing the reliability of pressing the core bracket 23 in the core housing 21 by the cover plate 24.

As shown in FIG. 18, since the first axial extension portion 2321 and the second axial extension portion 2341 extend in a direction close to the cover plate 24, the first press pillar 242 and the second press pillar 243 may extend in a direction close to the core 21. In some embodiment, heights of the first limiting structure 232 and the second limiting structure 234 relative to the bracket body 231 and heights of the first press pillar 242 and the second press pillar 243 relative to the cover plate body 241 may be half of a distance between the cover plate body 241 and the bracket body 231. Therefore, the first limiting structure 232 and the second limiting structure 234 may be prevented from being broken or falling off due to the excessive height of the first limiting structure 232 and the second limiting structure 234 relative to the bracket body 231 when the earphone 10 falls or collides. Alternatively, the first press pillar 242 and the second press pillar 243 may be prevented from being broken or falling off due to the excessive height of the first press pillar 242 and the second press pillar 243 relative to the cover plate body 241 when the earphone 10 falls or collides. Furthermore, structure strengths of the first limiting structure 232 and the second limiting structure 234 on the bracket body 231 and structure strengths of the first press pillar 242 and the second press pillar 243 on the cover plate body 241 may be considered.

Referring to FIG. 19, the first press pillar 242 may be disposed in a tubular shape. As shown in FIG. 18, the positioning pillar 213 may be inserted into the insertion hole 233 to increase the accuracy of assembly between the core bracket 23 and the core housing 21. The positioning pillar 213 may be further inserted into the first press pillar 242 to increase the accuracy of the assembly between the cover plate 24 and the core housing 21.

Figure 21:
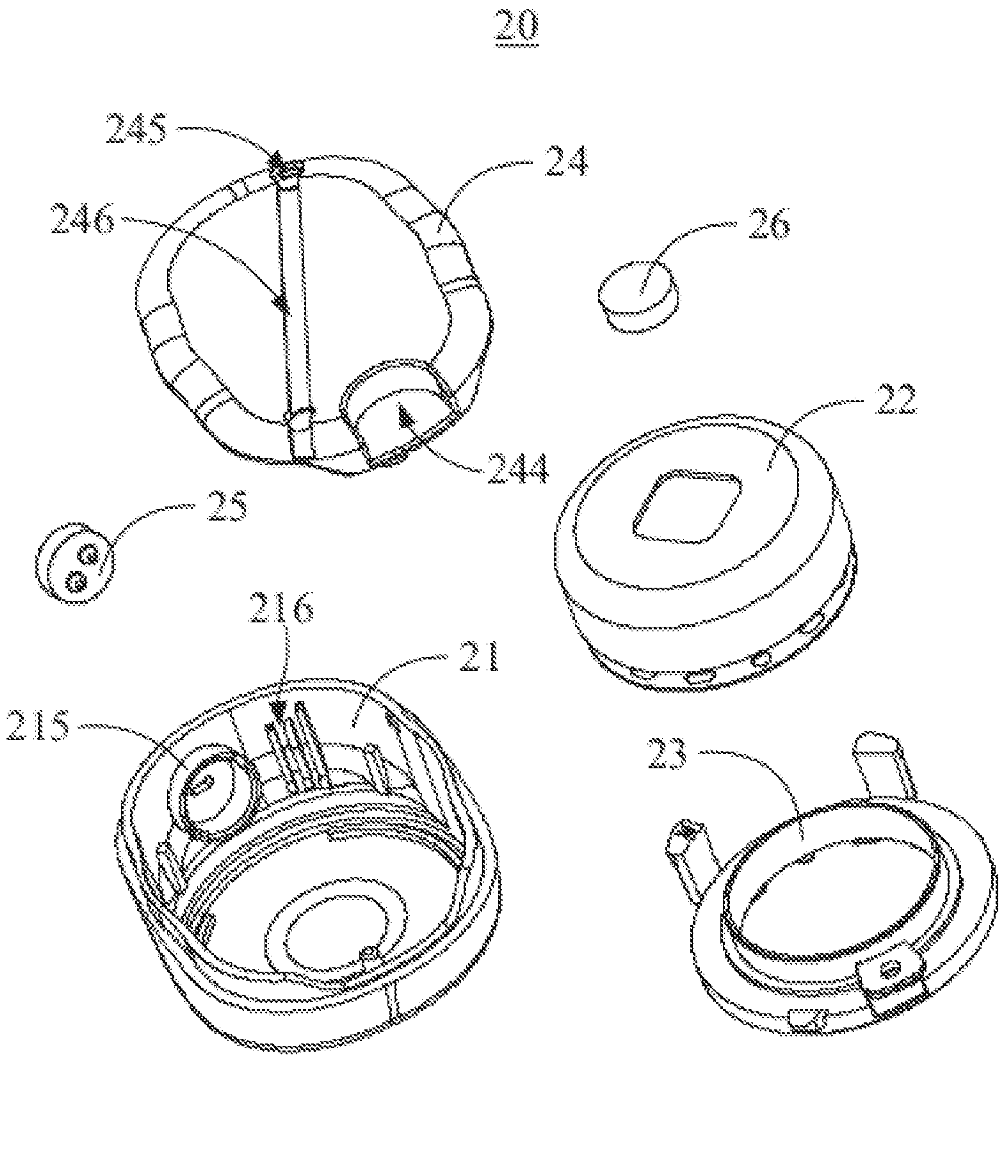
FIG. 21 is a schematic diagram of a breakdown structure of a core module of an earphone according to some embodiments of the present disclosure.

FIG. 21 is a schematic diagram of a breakdown structure of a core module of an earphone according to some embodiments of the present disclosure.

As shown in FIG. 21, in some embodiments, when the earphone is the bone conduction earphone, the core module 20 may further include a first microphone 25 and a second microphone 26. After the cover plate 24 is disposed on the opening end of the core housing 21, the cover plate 24 and the core housing 21 may form a chamber structure for accommodating the core 22. At this time, the first microphone 25 may be accommodated in the core housing 21. The second microphone 26 may be disposed outside the core housing 21. Therefore, the cover plate 24 may separate the first microphone 25 and the second microphone 26, thereby avoiding a generation of interference between the first microphone 25 and the second microphone 26 (e.g., back tone chambers of the first microphone 25 and the second microphone 26). Therefore, the cover plate 24 may increase the rigidity of the structure of the opening end of the core housing 21 (e.g., the cover plate 24 and the earphone fixing portion 311). In addition, the cover plate 24 may press the core bracket 23 in the core housing 21. The first microphone 25 and the second microphone 26 may be separated. Further, the cover plate 24 may achieve "one piece with three functions." In some embodiments, when the ear hook housing 31 is covered by the cover plate 24, that is, when the earphone fixing portion 311 is covered on one side of the cover plate 24 away from the core housing 21, the second microphone 26 may be disposed between the cover plate 24 and the earphone fixing portion 311.

The first microphone 25 and the second microphone 26 may be connected with the main circuit board 50 to transmit the sound to the main control circuit board 50. A type of one of the first microphone 25 and the second microphone 26 may include an electric type, a capacitive type, a piezoelectric type, a carbon particle type, a semiconductor type, or the like, or any combination thereof. For example, one of the first microphone 25 and the second microphone 26 may include an electret pickup, a silicon pickup, etc. A structure of the first microphone 25 and the second microphone 26 may be with in an understanding range of those skilled in the art, which is not detailed herein. At this time, the first microphone 25 and the second microphone 26 may be configured to pick up the sound of the environment where the user (e.g., a wearer) is located, so that the bone conductor headphone 10 may perform a noise reduction, thereby improving the user favorability of the earphone 10. In addition, the first microphone 25 and the second microphone 26 may also be configured pick up a voice of the user, so that the bone conductor headphone 10 may realize a microphone function while achieving a speaker function, thereby expanding an application range of the bone conductor headphone 10. The first microphone 25 and the second microphone 26 may also pick up the voice of the user and the sound of the environment thereof. Therefore, the bone conductor headphone 10 may achieve the microphone function while performing the noise reduction, thereby improving the user favorability of the earphone 10.

As shown in FIG. 21, in some embodiments, an annular flange 215 may be disposed in an inner side of the annular peripheral wall 212. The first microphone 25 may be embedded and fixed in the annular flange 215. The side of the cover plate 24 (e.g., the cover plate body 241) facing away from the core housing 21 may include a recess disposed with a microphone accommodation groove 244. The second microphone 26 may be disposed in the microphone accommodation groove 244, and covered by the earphone fixing portion 311. Therefore, an overall thickness of the earphone 10 may be reduced, thereby increasing the feasibility and reliability of the second microphone 26, the cover plate 24, and the earphone fixing portion 311. In other words, the first microphone 25 may be fixed on the annular peripheral wall 212. The second microphone 26 may be fixed on the cover plate 24. At this time, in order to facilitate the first microphone 25 and the second microphone 26 to pick up the voice of the user and/or the sound of the environment thereof, a pike-up hole (not shown in FIG. 21) may be opened at a position on the annular peripheral wall 212 corresponding to the first microphone 25. A pike-up hole (not shown in FIG. 21) may be opened at a position on the earphone fixing portion 311 corresponding to the second microphone 26. In some embodiments, an acoustic direction of the first microphone 25 may be disposed parallel to the cover plate 24 or inclined relative to the cover plate 24. An acoustic direction of the second microphone 26 may be perpendicular to the cover plate 24. Therefore, the first microphone 25 and the second microphone 26 may pick up the sound from different directions to increase the noise reduction and/or the microphone effect of the bone conductor headphone 10, thereby improving the user favorability of the bone conductor headphone 10.

It should be noted that the acoustic direction of the first microphone 25 may be perpendicular to the annular peripheral wall 212. Based on the above detailed description, the plane where the cover plate 24 (e.g., the cover plate body 214) is located may be parallel to the plane where the bottom wall 211 is located. The annular peripheral wall 212 may be perpendicular to the bottom wall 211. Alternatively, the annular peripheral wall 212 may be inclined outward relative to the bottom wall 211 at an angle. For example, the inclination angle may be less than or equal to 30 degrees. Therefore, when the annular peripheral wall 212 is perpendicular to the bottom wall 211, the acoustic direction of the first microphone 25 may be parallel to the cover plate 24. When the annular peripheral wall 212 is inclined outward relative to the bottom wall 211, the acoustic direction of the first microphone 25 may be inclined relative to the cover plate 24. The inclination angle of the annular peripheral wall 212 and the inclination angle of the acoustic direction may be substantially equal.

In some embodiments, a projection of the second microphone 26 on the cover plate 24 and a projection of the first microphone 25 on the cover plate 24 may be staggered from each other. Therefore, the first microphone 25 and the second microphone 26 may pick up the sound from different directions to increase the noise reduction and/or the microphone effect of the bone conductor headphone 10, thereby improving the user favorability of the bone conductor headphone 10. The projection of the second microphone 26 on the cover plate 24 may be disposed closer to the bending transition portion 312 than the projection of the first microphone 25 on the cover plate 24. Therefore, a relative distance between the first microphone 25 and the second microphone 26 may be increased. The first microphone 25 and the second microphone 26 may further pick up the sound from different directions. It should be noted that the greater the relative distance, the better.

It should be noted that under the perspective shown in FIG. 21, the first microphone 25 and the second microphone 26 may be located on opposite sides of the cover plate 24, respectively. The first microphone 25 may be located on a back surface of the cover plate 24, so that the projection of the first microphone 25 on the cover plate 24 may be actually invisible. Therefore, in order to facilitate the description, the first microphone 25 and the second microphone 26 may be simply considered to be located on a same side of the cover plate 24. The projection of the first microphone 25 on the cover plate 24 may be replaced with a dashed frame.

Figure 22:
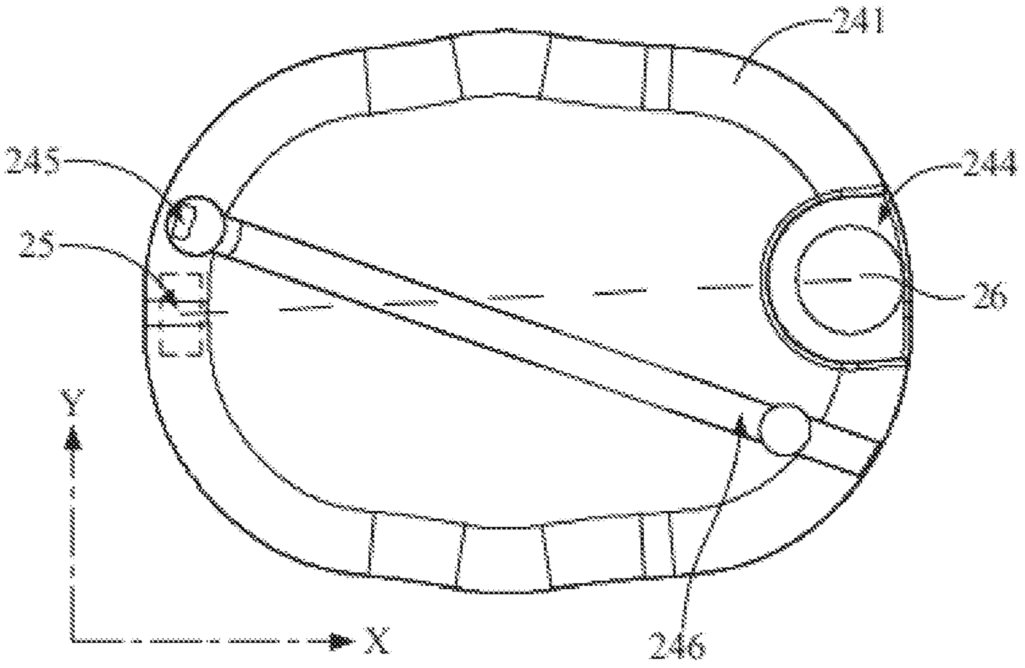
FIG. 22 is a schematic diagram illustrating a structure of a cover plate of an earphone according to some embodiments of the present disclosure.

FIG. 22 is a schematic diagram illustrating a structure of a cover plate of an earphone according to some embodiments of the present disclosure. As shown in FIG. 22, the cover plate 24 may include a long axis direction (e.g., a direction indicated by a dotted line X in FIG. 22) and a short axis direction (e.g., a direction indicated by a dotted line Y in FIG. 22). In some embodiments, the size of the cover plate 24 in the long axis direction may be greater than the size of the cover plate 24 in the short axis direction. At this time, an included angle between a line (e.g., a dotted line shown in FIG. 22) of the projection of the second microphone 26 on the cover plate 24 and the projection of the first microphone 25 on the cover plate 24 and the long axis direction may be less than 45 degrees. For example, the angle may be less than or equal to 10 degrees. As another example, the line of the projection of the second microphone 26 on the cover plate 24 and the projection of the first microphone 25 on the cover plate 24 may be overlapped with the long axis direction. Therefore, the projection of the second microphone 26 on the cover plate 24 and the projection of the first microphone 25 on the cover plate 24 may be staggered. The relative distance between the first microphone 25 and the second microphone 26 may be increased, thereby further causing the first microphone 25 and the second microphone 26 to pick up the sound from different directions. The projection of the second microphone 26 on the cover plate 24 may be disposed closer to the bending transition portion 312 than the projection of the first microphone 25 on the cover plate 24.

Based on the above detailed description, the core 22 and the first microphone 25 may be disposed in the core housing 21. The cover plate 24 may be also covered on the opening end of the core housing 21. For easy wiring, corresponding through holes and grooves may be disposed on the cover plate 24. As shown in FIG. 21 and FIG. 16, in some embodiments, a threaded hole 245 may be also disposed on the cover plate 24. In some embodiments, the threaded hole 245 may be disposed close to the first microphone 25. Therefore, the leading wire connecting the first microphone 25 and the main control circuit board 50 (not shown in FIG. 21 and FIG. 16) may be extended from the core housing 21 to one side of the cover plate 24 facing away from the core housing 21 through the threaded hole 245, and further extended to the accommodation bond 313 through the wiring channel in the bending transition portion 312. At this time, after the earphone fixing portion 311 covers the cover plate 24, a portion of the leading wire (a length of which is equal to or greater than a linear distance between the threaded hole 245 and the second microphone 26) may be located between the cover plate 24 and the earphone fixing portion 311.

As shown in FIG. 21 and FIG. 16, in some embodiments, the side of the cover plate 24 facing away from the core housing 21 may further include a recess disposed with a wiring groove 246. One end of the wiring groove 246 may be in communication with the threaded hole 245. The leading wire may further extend along the wiring groove 146. Therefore, an overall thickness that a portion of the leading wire is disposed between the cover plate 24 and the earphone fixing portion 311, thereby increasing the feasibility and reliability of the leading wire, the cover plate 24, and the earphone fixing portion 311.

It should be noted that after the leading wire is traveled from the threaded hole 245 and the wiring groove 246 in the core housing 21, two ends of the wiring groove 246 may be performed point glue, so that the leading wire may be relatively fixed with the cover plate 24. Further, the compactness of the cover plate 24, the earphone fixing portion 311, and the leading wire may be increased. The point glue performed at the threaded hole 245 may also improve the airtightness of the core module 20.

Referring to FIG. 21, in some embodiments, two wire management grooves 216 may be disposed in parallel in the inner side of the annular peripheral wall 212. The two wire management grooves 216 may be close to the annular flange 215. Two welded joints formed between positive and negative outer wires (not shown in FIG. 21) and positive and negative terminals of the core 22 (not shown in FIG. 21) may be accommodated in the two wire management grooves 216, respectively. Therefore, short-circuits may be avoided when the positive and negative terminals of the core 22 are welded to positive and negative anodes of the above leading wires, thereby increasing the reliability of the wiring of the core 22.

In some embodiments, when the bone conductor earphone 10 is also disposed with the button 36 as shown in FIG. 4, the side of the cover plate 24 facing away from the core housing 21 may be disposed with a button accommodation groove. The button 36 may be disposed in the button accumulation groove and covered by the earphone fixing portion 311. Therefore, after the button 36 is disposed between the cover plate 24 and the earphone fixing portion 311, the overall thickness of the bone conductor earphone 10 may be reduced, thereby increasing the feasibility and reliability of the button 36, the cover plate 24, and the earphone fixing portion 311. It should be noted that the button accommodation groove may be similar to the above microphone accommodation groove 244, which is not repeated herein.

It should be noted that the accommodation bin 313 shown in FIG. 2 may be configured to accommodate the main circuit board 50. The accommodation bin 313 shown in FIG. 4 may be configured to accommodate the battery 60. Therefore, each of the first microphone 25 and the second microphone 26 may correspond to the ear hook assembly 30 as shown in FIG. 2, so that the first microphone 25 and the second microphone 26 may be connected with the main control circuit board 50, thereby shortening a distance of the wiring. In addition, since volumes of the core module 20 and the ear hook assembly 30 are limited, if the button 36 is disposed with the first microphone 25 and the second microphone 26, the button 36, the first microphone 25, and the second microphone 26 may result in interference. Therefore, the button 36 may correspond to the ear hook assembly 30 shown in FIG. 4. In other words, if the button 36 corresponds to the left ear hook of the earphone 10, the first microphone 25 and the second microphone 26 may correspond to the right ear hook of the earphone 10. Conversely, if the button 36 corresponds to the right ear hook of the earphone 10, the first microphone 25 and the second microphone 26 may correspond to the left ear hook of the earphone 10. Further, for the core module 20 as shown in FIG. 8, since the core module 20 includes no cover plate 24 of the core module 20 as shown in FIG. 16, related structures of the first microphone 25, the second microphone 26, the buttons 36, etc., may be adjusted accordingly. For example, the earphone 10 may include one of the first microphone 25 or the second microphone 26. Alternatively, the earphone 10 may include the first microphone 25 and the second microphone 26. When one of the first microphone 25 and the second microphone 26 corresponds to the left ear hook of the earphone 10, the other of the first microphone 25 and the second microphone 26 may correspond to the right ear hook of the earphone 10. As another example, the button 36 may be fixed on one side of the earphone fixing portion 311 close to the core housing 21.

Figure 23:
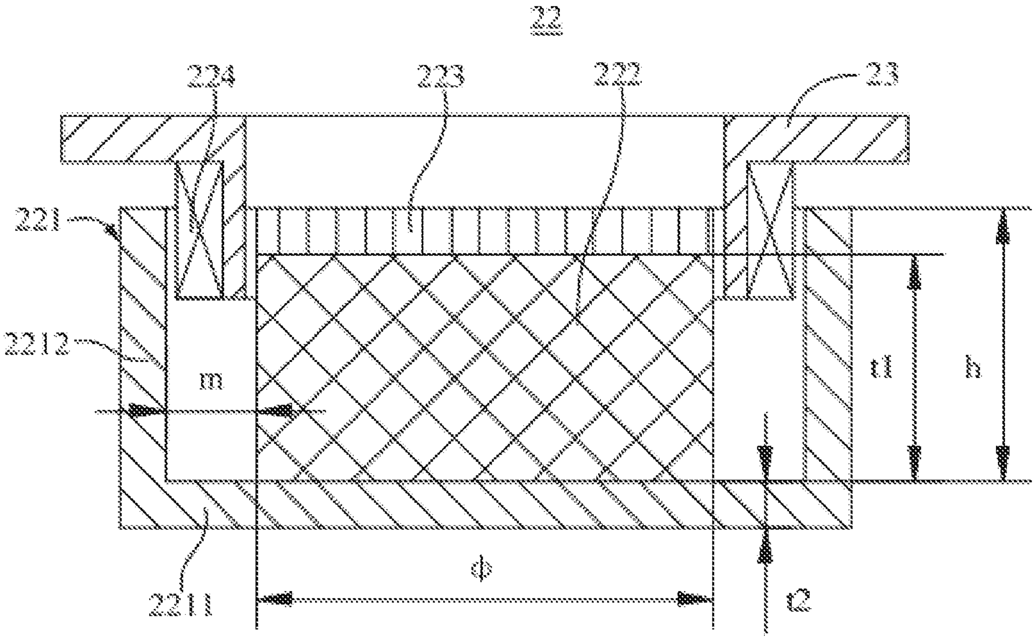
FIG. 23 is a schematic diagram illustrating a core according to some embodiments of the present disclosure.

FIG. 23 is a schematic diagram illustrating a core according to some embodiments of the present disclosure.

Referring to FIG. 23, in some embodiments, the core 22 may include a magnetic conduction shield 221, a magnet 222, a magnetic conduction plate 223, and a coil 224. The magnetic conduction shield 221 may include a bottom plate 2211 and an annular side plate 2212 integrally connected with the bottom plate 2211. Further, the magnet 222 may be disposed in the annular side plate 2212 and fixed on the bottom plate 2211. The magnetic conduction plate 223 may be fixed on one side of the magnet 2211 facing away from the bottom plate 2211. The coil 224 may be disposed in a magnetic gap 225 between the magnet 222 and the annular side plate 2212, and fixed on the core bracket 23. In some embodiments, the magnetic gap 225 between the magnet 222 and the annular side plate 2212 may be m. m may be within a range of 1.0 millimeter to 1.5 millimeters to balance motion requirements of the coil 224 and the compactness of the core 22.

It should be noted that the core shown in FIG. 23 may correspond to the core module shown in FIG. 8 or the core module shown in FIG. 16. In some embodiments, the core bracket shown in FIG. 23 is mainly for the convenience of describing the relative position relationship between the core bracket and the core, which may further implicitly indicate a possible assembly manner between the core bracket and the core.

In some embodiments, the magnet 222 may be a metal alloy magnet, a ferrite, or the like. For example, the metal alloy magnet may include neodymium iron boron, samarium cobalt, aluminum nickel cobalt, iron chromium cobalt, aluminum iron boron, iron carbon aluminum, or the like, or any combination thereof. The ferrite may include barium ferrite, steel ferrite, magnesium manganese ferrite, lithium manganese ferrite, or the like, or any combination thereof. Further, the magnet 222 may include a magnetization direction to form a relatively stable magnetic field.

Referring to FIG. 23, the magnetic conduction shield 221 and the magnetic conduction plate 223 may cooperate with each other for adjusting the magnetic field generated by the magnet 222 to increase the utilization of the magnetic field. In some embodiments, the magnetic conduction shield 221 and the magnetic conduction plate 223 may be processed by a paramagnetic material, such as metal materials, metal alloys, metal oxide materials, amorphous metal materials, etc. For instance, the above paramagnetic material may include iron, iron silicon alloy, iron aluminum alloy, nickel iron alloy, iron cobalt alloy, a low carbon steel, a silicon steel sheet, a coiled silicon steel sheet, ferrite, etc.

Therefore, the coil 224 may be located in the magnetic field formed by the magnet 222, the magnetic conduction shield 221, and the magnetic conduction plate 223. Under the excitation of electrical signals, the coil 224 may be subjected to an ampere force. The coil 224 may cause the core 22 to generate mechanical vibrations under the driving of the ampere force. The core 22 may be fixed in the core housing 21 through the core bracket 23, so that the core housing 21 may be vibrated with the core 22. In some embodiments, an electric resistance of the coil 224 may be a constant (e.g., 8 Ohms (Ω)) to balance generation requirements of the ampere force and the circuit structure of the core 22.

Based on the above detailed description, the volume of the core housing 21 may be limited. The core housing 21 may at least accommodate structural members such as the core 22, the core bracket 23, the first microphone 25, etc. Although a greater ampere force may be obtained by increasing a size of the core 22 (e.g., increasing a volume of the magnet 222 and/or increasing a count of turns of the coil 224) to better driving the core housing 21, a weight and volume of the core module 20 may be increased, which is not conducive to the lightness of the core module 20. To this end, in some embodiments, the core 22 may be improved and designed based on the ampere-based Equation (3):

$$F=BIL\sin\theta, \tag{3}$$

where, the parameter B may represent an intensity of the magnetic field formed by the magnet 222, the magnetic conduction shield 221, and the magnetic conduction plate 223, the parameter L may represent a valid length of the coil 224 in the magnetic field, the parameter θ may represent an included angle of the parameter B and the parameter L, and the parameter I may represent a current at a certain moment in the coil 224. For a designed, manufactured, and assembled core 22, the parameter B and the parameter L may be determined values. The parameter I may vary with the variation of the electrical signal input in the core 22. Therefore, the optimization design of the core 22 may be simply considered to be an optimized design on a force coefficient BL. The parameter B and the parameter L may be dependent on structural parameters (e.g., shapes, sizes, etc.) of the magnet 222, the magnetic housing 221, and the magnetic conduction plate 223.

Effect of the structural parameters (e.g., the shape, size, etc.) of the magnet 222, the magnetic housing 221, and the magnetic conduction plate 223 on the force coefficient BL may be described in detail.

Figure 24:
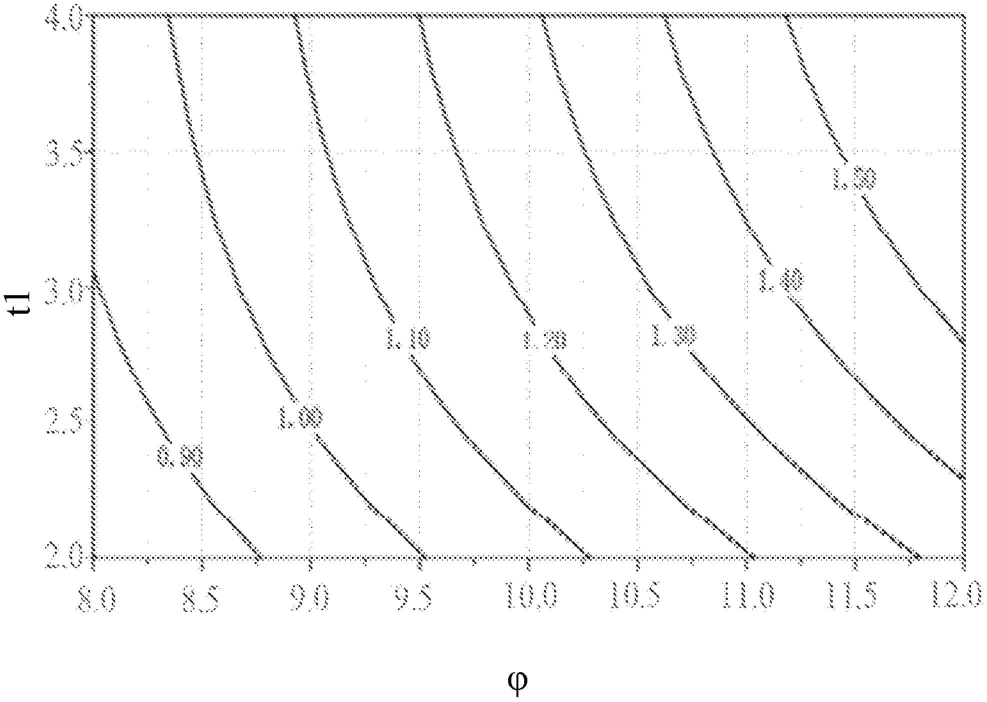
FIG. 24 is a schematic diagram illustrating a relationship between a force coefficient BL and a magnet of an earphone according to some embodiments of the present disclosure.

FIG. 24 is a schematic diagram illustrating a relationship between a force coefficient BL and a magnet of an earphone according to some embodiments of the present disclosure. In some embodiments of the present disclosure, the magnet 222 may be cylindrical. As shown in FIG. 24, an abscissa is a diameter φ of the magnet 222. An ordinate is a thickness t1 of the magnet 222. It may be obtained according to FIG. 24 that the greater the diameter φ of the magnet 222, the greater the value of the force coefficient BL. The greater the thickness t1 of the magnet 222, the greater the value of the force coefficient BL. In some embodiments, in order to cause the bone conductor headphone 10 to generate a sufficient volume and a sufficiently large ampere force is generated to drive the coil 224 to vibrate, the value of the force coefficient BL may be greater than 1.3. In some embodiments, based on a comprehensive consideration of the weight and volume of the core module 20 (e.g., the core 22), the diameter φ of the magnet 222 may be within a range of 10.5 millimeters to 11.5 millimeters, and the thickness t1 of the magnet 222 may be within a range of 3.0 millimeters to 4.0 millimeters. For example, the diameter φ of the magnet 222 may be 10.8 millimeters, and the thickness t1 of the magnet 222 may be 3.5 millimeters.

Figure 25:
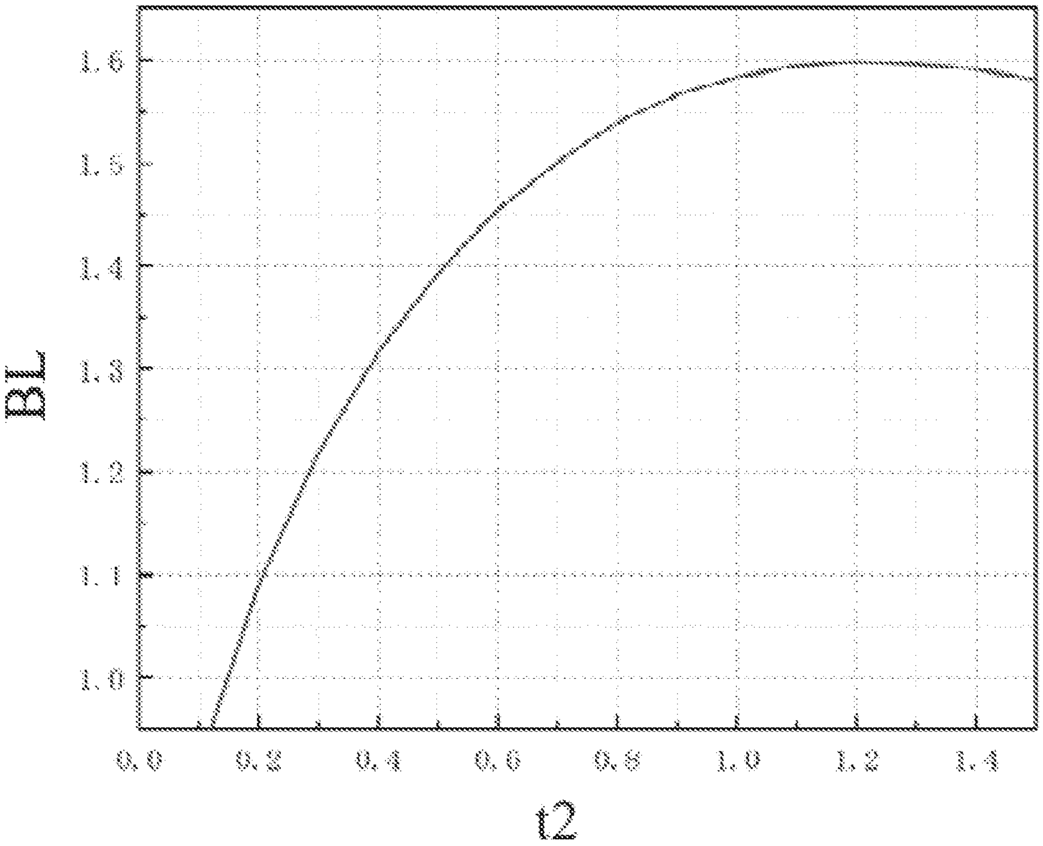
FIG. 25 is a schematic diagram illustrating a relationship between thicknesses of a magnetic conduction shield and a magnetic conduction plate of an earphone and a force coefficient BL according to some embodiments of the present disclosure.

In some embodiments, a diameter of the magnetic conduction plate 223 may be equal to the diameter of the magnet 222. A thickness of the magnetic conduction plate 223 may be equal to the thickness of the magnetic conduction shield 221. A material of the magnetic conduction plate 223 may be the same as a material of the magnetic conduction shield 221. FIG. 25 is a schematic diagram illustrating a relationship between thicknesses of a magnetic conduction shield and a magnetic conduction plate of an earphone and a force coefficient BL according to some embodiments of the present disclosure. As shown in FIG. 25, an abscissa is a thickness t2 of the magnetic conduction shield 221. An ordinate is a force coefficient BL. It may be obtained without doubt that within a certain range, a value of the force coefficient BL may increase as the thickness t2 increases. When t2 is greater than 0.8 millimeters, the variation of the value of the force coefficient BL may not be obvious. That is, after t2 is greater than 0.8 millimeters, when the thickness t2 is continued to increase, the effect may be small, but the weight of the core 22 may be increased. Therefore, based on the comprehensive consideration of the force coefficient BL (e.g., greater than 1.3) and the weight and volume of the core module 20 (e.g., the core 22), the thickness t2 of the magnetic conduction plate 223 and the magnetic conduction shield 221 may be within a range of 0.4 millimeters to 0.8 millimeters. For example, the thickness t2 may be 0.5 millimeters.

Figure 26:
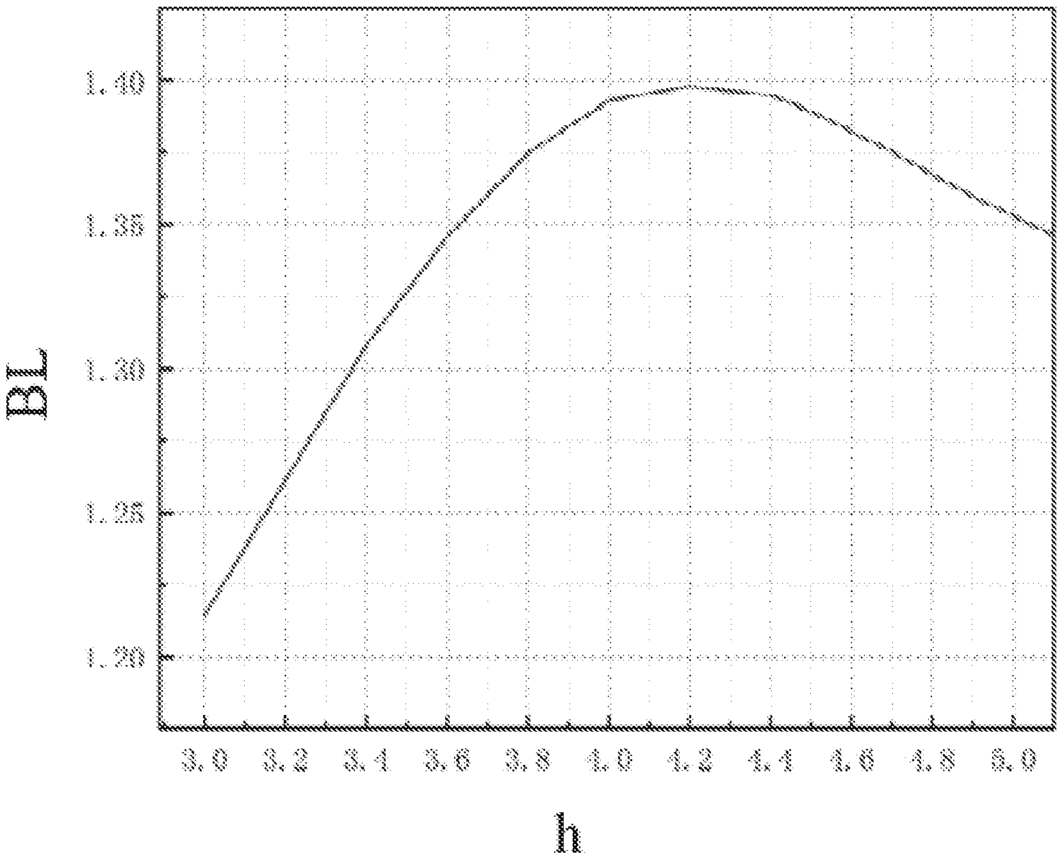
FIG. 26 is a schematic diagram illustrating a relationship between a height of the magnetic conduction shield of an earphone and a force coefficient BL according to some embodiments of the present disclosure.

In some embodiments, the annular side plate 2212 may also be cylindrical. A diameter D of the annular side plate 2212 may be a sum of the diameter φ of the magnet 222 and twice the magnetic gap m. That is, the diameter D of the annular side plate 2212 may be determined according to an equation $D=\varphi+2m$. FIG. 26 is a schematic diagram illustrating a relationship between a height of the magnetic conduction shield of an earphone and a force coefficient BL according to some embodiments of the present disclosure. As shown in FIG. 26, an abscissa is a height h of the magnetic conduction shield 221 (e.g., the annular side plate 2212). An ordinate is a force coefficient BL. It may be obtained without doubt that within a certain range, the value of the force coefficient BL may increase with the increase of the height h of the magnetic conduction shield 221. However, after the height h is greater than 4.2 millimeters, the value of the force coefficient BL may be decreased with the increase of the height h of the magnetic conduction shield 221. Therefore, based on the comprehensive consideration of the force coefficient BL (e.g., greater than 1.3) and the weight and volume of the core module 20 (e.g., the core 22), the height h of the magnetic conduction shield 221 may be within a range of 3.4 millimeters to 4.0 millimeters. For example, the height h of the magnetic conduction shield 221 may be 3.7 millimeters.

Referring to FIG. 1, the earphone 10 may include two core modules 20. One of the two core modules 20 may correspond to the core module shown in FIG. 8, and the other may correspond to the core module shown in FIG. 16. It should be noted that a specific structure of each core module 20 may be the same as or similar to one of the above embodiments, which may be referred to the detailed description of any of the above embodiments and not be repeated herein.

Figure 27:
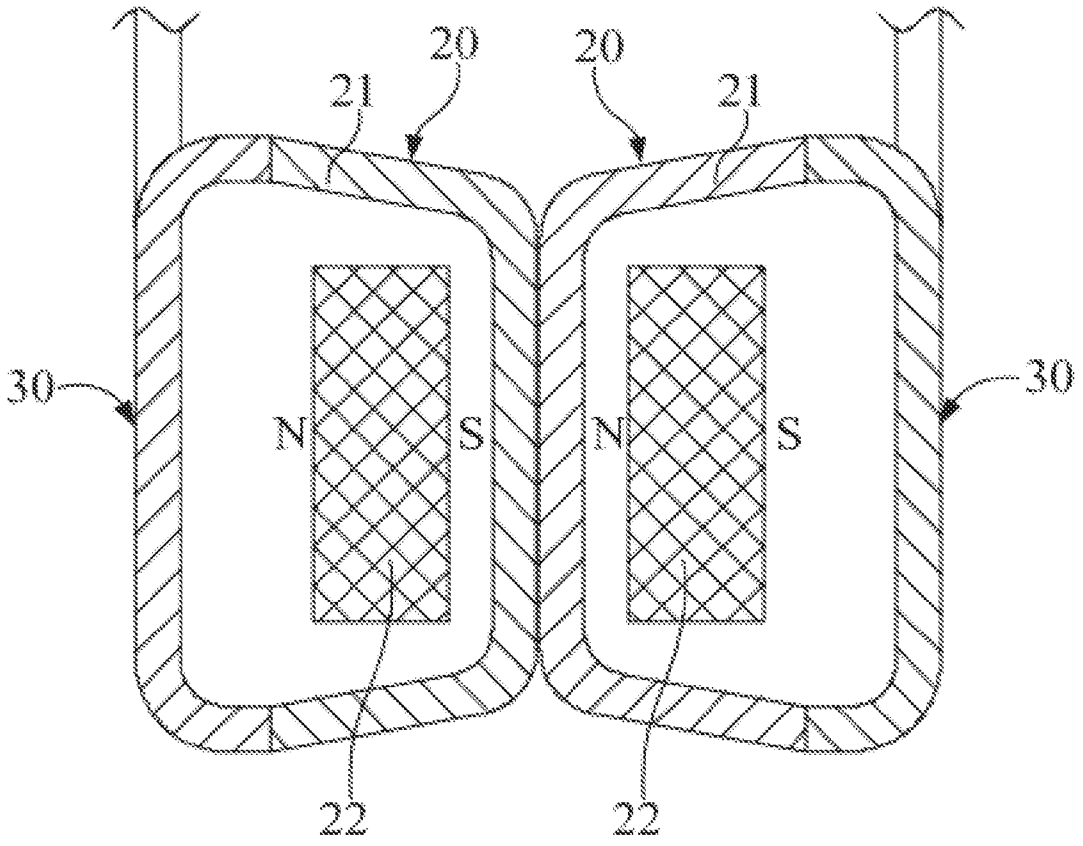
FIG. 27 is a schematic diagram illustrating a magnetic pole direction of a magnet of an earphone according to some embodiments of the present disclosure.

FIG. 27 is a schematic diagram illustrating a magnetic pole direction of a magnet of an earphone according to some embodiments of the present disclosure.

As shown in FIG. 27, in some embodiments, the magnets 222 of the two core modules 20 may have different polarities on one side close to the bottom wall 211 of the core housing 21 where the magnets 222 are located. When the earphone 10 is in a non-wearing state, the two core modules 20 may adsorb each other. Therefore, the user may store the earphone 10. It should be noted that the magnet 222 may be also configured to form a magnetic field, so that the coil 224 may generate the vibrations under the excitation of the electrical signals. At this time, the magnet 222 may achieve "one piece with two functions."

In some embodiments, before the core modules 20 are assembled, the magnets 222 may not be pre-magnetized. However, after the core modules 20 are assembled, the core modules 20 may be placed in a magnetizing device, so that the magnets 222 may have magnetic properties. After the magnetizing, magnetic field directions of the magnets 222 of the two core modules 20 may be shown in FIG. 27. Therefore, since the magnets 222 do not have the magnetic properties before the assembly, the assembly of the core modules 20 may not be interfered from a magnetic force. Therefore, the assembly efficiency and the yield rate of the core module 20 may be increased, thereby improving the productivity capacity and the and benefits of the earphone 10.

Figure 28:
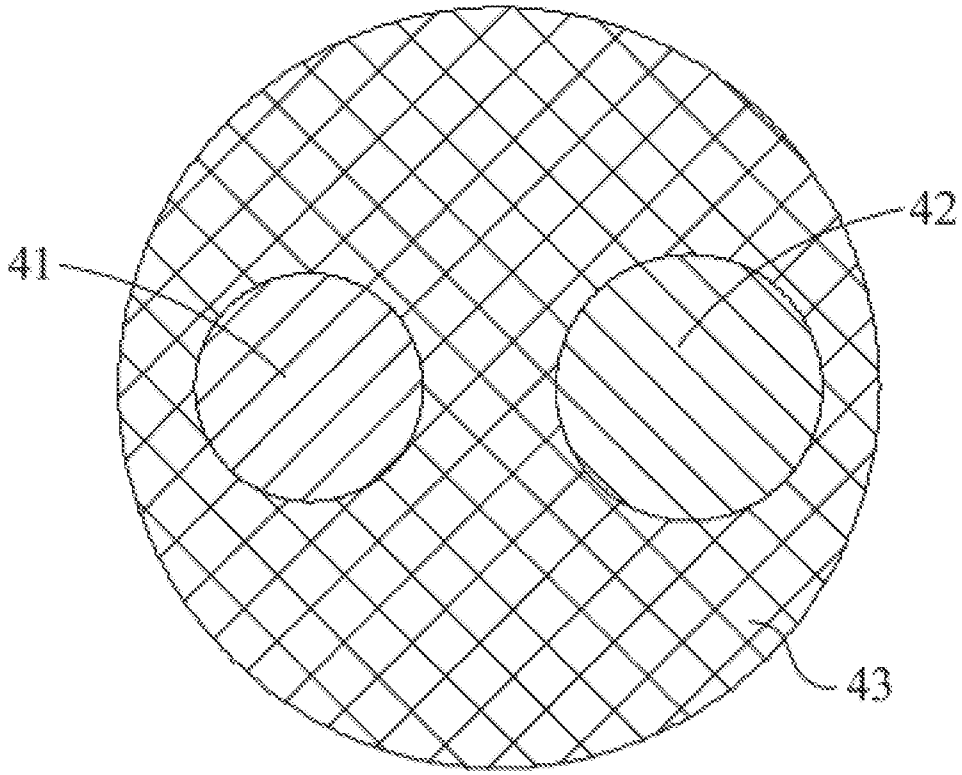
FIG. 28 is a schematic diagram illustrating a cross-sectional structure of a rear hook assembly of an earphone according to some embodiments of the present disclosure.

FIG. 28 is a schematic diagram illustrating a cross-sectional structure of a rear hook assembly of an earphone according to some embodiments of the present disclosure.

As shown in FIG. 28, in some embodiments, the rear hook assembly 40 may include an elastic metal wire 41, a leading wire 42, and an elastic cladding 43 that clads the elastic metal wire 41 and the leading wire 42. The elastic cladding 43 and the leading wire 42 may be an integrally structural piece formed by extruded. The elastic cladding 43 may further form a threaded channel (not marked in FIG. 28). The elastic metal wire 41 may be inserted in the threaded channel. In some embodiments, the threaded channel may be formed during the extrusion formation. In some embodiments, a material of the elastic metal wire 41 may include spring steel, titanium alloy, titanium nickel alloy, chromium molybdenum steel, or the like, or any combination thereof. A material of the elastic cladding 43 may include polycarbonate, polyamide, silica gel, rubber, or the like, or any combination thereof, to balance the wearing comfort and the rigidity of the structure of the rear hook assembly 40.

It should be noted that since the elastic metal wire 41 is inserted in the elastic cladding 43 via the threaded channel, a region where the elastic metal wire 41 is located in FIG. 28 may be simply considered as a threaded channel in the elastic cladding 43.

In some embodiments, a diameter of the threaded channel in a natural state may be less than a diameter of the elastic metal wire 41, so that the elastic metal wire 41 may fill the threaded channel and maintain fixed with the elastic cladding 43 after inserting the elastic cladding 43. Therefore, "sagging" of the rear hook assembly 40 due to an excessively large gap between the elastic cladding 43 and the elastic metal wire 41 (e.g., the rear hook assembly 40 is pressed by the user) may be avoided. The compactness of the rear hook assembly 40 may be increased.

In some embodiments, a count of the leading wires 42 may be at least two strands. In some embodiments, each strand of the leading wire 42 may include a metal wire and an insulation layer (not shown in FIG. 28) cladding the metal wire. The insulation layer may be configured to achieve electrical insulation between the metal wires.

It should be noted that, as shown in FIGS. 1, 2, 3, 8, and 16, since the main control circuit board 50 and the battery 60 may be disposed in two ear hook assemblies 30, and the ear hook assemblies 30 shown in FIG. 2 and FIG. 3 may correspond to the left ear hook and the right ear hook of the bone conductor headphone 10, respectively, so that the main control circuit board 50 and the battery 60 may be connected through the leading wire 42 built into the rear hook assembly 40, and the core module 20 (e.g., the core 22) corresponding to the ear hook assembly 30 in FIG. 1 (on the left) and the button 36 may be connected the main control circuit board 50 corresponding to the ear hook assembly 30 in FIG. 1 (on the right) through the leading wire 42 built into the rear hook assembly 40. The core module 20 (e.g., the core 22, the first microphone 25, and the second microphone 26) corresponding to the ear hook assembly 30 in FIG. 1 (on the right) may be further connected the battery 60 corresponding to the ear hook assembly 30 in FIG. 1 (on the left) through the leading wire 42 built into the rear hook assembly 40. Therefore, the leading wires 42 may be configured to connect the three circuits.

Based on the above detailed description, the rear hook assembly 40 of the present disclosure may be manufactured according to the following process.

In operation 1, an extrusion molding device and a leading wire may be provided.

Raw materials for molding the elastic cladding 43 may be added into the extrusion molding device. During the extrusion molding, operations on the raw materials of the elastic cladding 43 may include a molten plasticization, an extrusion from a die (or a handpiece), shaping, cooling, traction, etc.

The count of leading wires 42 may be at least two strands to facilitate the connection between various electronic components in the earphone 10. Further, each strand 42 may include a metal wire and an insulation layer cladding the metal wire to facilitate an electrical insulation between the metal wires.

In operation 2, the leading wire may be placed in the extrusion molding device, so that a corresponding first semi-manufactured product may be obtained from the raw materials of the elastic cladding and the leading wire during the extrusion molding.

The extrusion molding device may be configured to lead the leading wire 42 to cause the elastic cladding 43 to cover the leading wire 42 during the extrusion molding. Further, a mold core may be disposed on the handpiece of the extrusion molding device to form the above threaded channel inside the elastic cladding 43 during the extrusion molding, simultaneously. Therefore, the first semi-manufactured product may be an integrally structural piece of the elastic cladding 43 and the leading wire 42, and the inside of the elastic cladding 43 may include the threaded channel extending along the axial direction of the elastic cladding 43.

In operation 3, according to use requirements of the rear hook assembly, the first semi-manufactured product may be further cut into a second semi-manufactured product having a corresponding length.

An actual length of the second semi-manufactured product may be slightly greater than a use length for the rear hook assembly. That is, the second semi-manufactured product may include an amount of margin to facilitate one or more subsequent processes.

In operation 4, the elastic metal wire may be disposed in the threaded channel of the second semi-manufactured product to obtain the rear hook assembly.

After operation 4, the rear hook assembly may be formed a bending structure including a certain shape to adapt to the user's head. Two ends of the rear hook assembly may be treated accordingly to be fixedly connected with the ear hook assembly, thereby achieving a circuit connection between the main circuit board, the battery, the button, the core, the first microphone, and the second microphone. Therefore, the rear hook assembly manufactured in operation 4 may be essentially a semi-manufactured product.

Through the above manner, a semi-manufactured product (e.g., the integrally structural piece of the elastic cladding 43 and the leading wire 42) with a long length may be manufactured at one time by using the extrusion molding process. The inside of the elastic cladding 43 may include the threaded channel extending along the axial direction of the elastic cladding 43, simultaneously. The semi-manufactured product may be cut into a plurality of small sections with the corresponding length for performing the subsequent processes, which may effectively improve the production efficiency of the rear hook assembly.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially" and etc. Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

At last, it should be understood that the embodiments described in the present application are merely illustrative of the principles of the embodiments of the present application. Other modifications that may be employed may be within the scope of the application. Thus, by way of example, but not of limitation, alternative configurations of the embodiments of the application may be utilized in accordance with the teachings herein. Accordingly, embodiments of the present disclosure are not limited to that precisely as shown and described.

What is claimed is:

1. An earphone, comprising:
a wearing assembly; and
a core module disposed on one end of the wearing assembly, the wearing assembly being configured to fix the core module on a head of a user, wherein
the core module includes a core housing, a core, and a cover plate, an opening being disposed on one end of the core housing, and the cover plate being covered on the opening of the core housing to form a chamber structure inside the core housing for accommodating the core; and
the wearing assembly includes an ear hook housing, wherein the ear hook housing includes an earphone fixing portion, a bending transition portion, and an accommodation bin which are sequentially connected, the earphone fixing portion being connected to a side of the cover plate facing away from the core housing.

2. The earphone of claim 1, wherein the earphone includes a first microphone and a second microphone, wherein
the first microphone is accommodated in the core housing, and
the second microphone is disposed outside the core housing.

3. The earphone of claim 2, wherein the second microphone is disposed between the cover plate and the earphone fixing portion, a projection of the second microphone on the cover plate and a projection of the first microphone on the cover plate are staggered from each other, and the projection of the second microphone on the cover plate is closer to the bending transition portion than the projection of the first microphone on the cover plate.

4. The earphone of claim 2, wherein the cover plate includes a long axis direction and a short axis direction, wherein
a size of the cover plate in the long axis direction is greater than a size of the cover plate in the short axis direction, and
an included angle between a line of a projection of the second microphone on the cover plate and a projection of the first microphone on the cover plate and the long axis direction is less than 45 degrees.

5. The earphone of claim 2, wherein
a threaded hole is disposed on the cover plate,
a wiring channel is disposed inside the bending transition portion, wherein
the threaded hole is disposed close to the first microphone to allow a leading wire connected to the first microphone to extend from the core housing to the side of the cover plate facing away from the core housing through the threaded hole, and extend to the accommodation bin through the wiring channel, and
the side of the cover plate facing away from the core housing is disposed with a microphone accommodation groove and a wiring groove concave to the chamber structure, wherein
the second microphone is disposed in the microphone accommodation groove,
one end of the wiring groove is in communication with the threaded hole, and
the leading wire extends along the wiring groove.

6. The earphone of claim 2, wherein
the core housing includes a bottom wall and an annular peripheral wall, one end of the annular peripheral wall being integrally connected with the bottom wall, and the cover plate being covered at another end of the annular peripheral wall and opposite to the bottom wall, the bottom wall being configured to contact with the user; and
the first microphone is disposed on the annular peripheral wall, an acoustic direction of the second microphone being perpendicular to the cover plate, and an acoustic direction of the first microphone being disposed parallel to the cover plate or inclined relative to the cover plate.

7. The earphone of claim 6, wherein
an annular flange is disposed in an inner side of the annular peripheral wall,
the first microphone is embedded and fixed in the annular flange,
two wire management grooves are disposed in the inner side of the annular peripheral wall, and
welded joints formed between positive and negative terminals of the core and positive and negative outer wires are accommodated in the two wire management grooves, respectively.

8. The earphone of claim 6, wherein a ratio of a difference between a rigidity of the bottom wall and a rigidity of the cover plate and the rigidity of the bottom wall is less than or equal to 10%.

* * * * *